US008042785B2

(12) United States Patent
Durello

(10) Patent No.: US 8,042,785 B2
(45) Date of Patent: Oct. 25, 2011

(54) DISPLAY STAND

(75) Inventor: Massimo Durello, Polverara (IT)

(73) Assignee: Lucenti S.r.l., Padua (IT)

( * ) Notice: Subject to any disclaimer, the term of this patent is extended or adjusted under 35 U.S.C. 154(b) by 153 days.

(21) Appl. No.: 12/446,398

(22) PCT Filed: Mar. 20, 2007

(86) PCT No.: PCT/IB2007/000846

§ 371 (c)(1), (2), (4) Date: Apr. 20, 2009

(87) PCT Pub. No.: WO2008/047182

PCT Pub. Date: Apr. 24, 2008

(65) Prior Publication Data

US 2010/0133395 A1 Jun. 3, 2010

(30) Foreign Application Priority Data

Oct. 19, 2006 (IT) ................................. PD06A0387

(51) Int. Cl.
*F16M 13/00* (2006.01)

(52) U.S. Cl. ......... 248/558; 248/159; 211/123; 211/206

(58) Field of Classification Search .................. 248/558, 248/159, 127; 211/123, 188, 163, 194, 206, 211/182

See application file for complete search history.

(56) References Cited

U.S. PATENT DOCUMENTS

| | | | | |
|---|---|---|---|---|
| 1,723,216 | A * | 8/1929 | Stam | 52/223.5 |
| 3,170,418 | A | 2/1965 | Gruenstein | |
| 3,908,943 | A | 9/1975 | Bannister | |
| 4,619,549 | A | 10/1986 | Gilbreth | |
| 4,865,283 | A | 9/1989 | Parker | |
| 4,934,015 | A * | 6/1990 | Mink | 15/268 |
| 5,908,121 | A | 6/1999 | Dardashti | |
| 6,062,150 | A * | 5/2000 | Sikora et al. | 108/190 |
| 6,260,488 | B1 * | 7/2001 | Yang et al. | 108/107 |
| 7,448,634 | B1 * | 11/2008 | Raub | 280/79.3 |
| 2002/0118536 | A1 | 8/2002 | Wu | |
| 2004/0020878 | A1 * | 2/2004 | Boron | 211/59.2 |
| 2004/0129661 | A1 * | 7/2004 | Segall et al. | 211/206 |
| 2004/0222179 | A1 * | 11/2004 | Garcia | 211/206 |
| 2006/0138066 | A1 | 6/2006 | Hung et al. | |

FOREIGN PATENT DOCUMENTS

| | | | |
|---|---|---|---|
| FR | 2203560 | A | 5/1974 |
| GB | 2326186 | A | 12/1998 |

* cited by examiner

*Primary Examiner* — Terrell Mckinnon
*Assistant Examiner* — Bradley Duckworth
(74) *Attorney, Agent, or Firm* — Browdy and Neimark, PLLC

(57) ABSTRACT

Display stand for displaying products, which comprises a support structure (2) which extends from a support base (3) with one or more columns (4), each of which is formed by at least two modular profiles (6) which can be assembled together in succession by means of first fixing means (7). Fastening means are envisaged, said means being able to be mechanically associated with the support structure (2) so as to form an overstructure with a configuration which can be modified, where required, in order to support directly or indirectly the products or services to be displayed or publicised. The fixing means (7) comprise at least one male part (13) which is mechanically constrained to a first modular profile (6) and at least one female part which is mechanically constrained to a second modular profile (6), said parts being able to be removably coupled together by means of fast-fit engaging means.

20 Claims, 22 Drawing Sheets

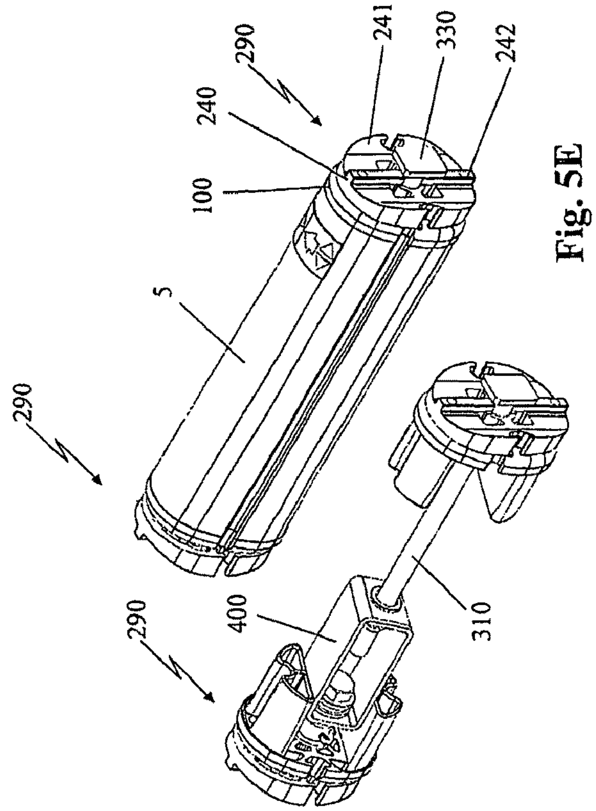
Fig. 5E
Fig. 5F
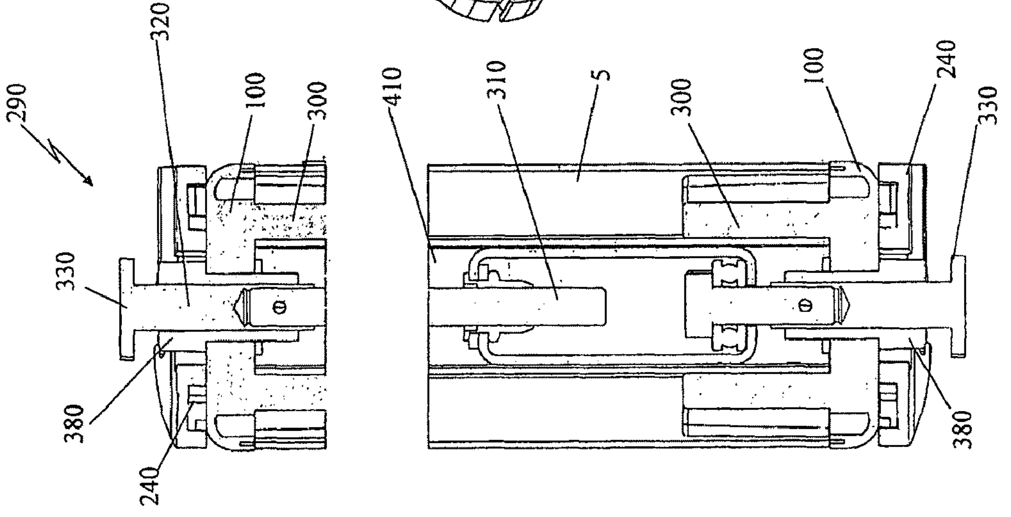
Fig. 5D
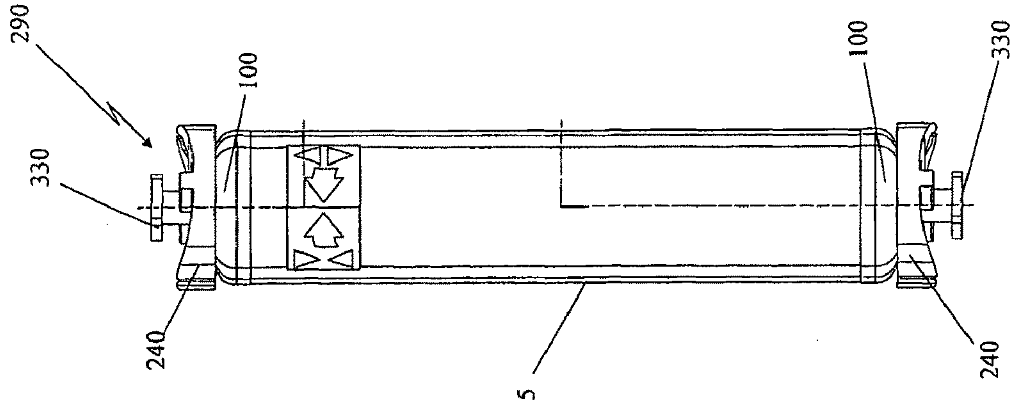
Fig. 5C

DISPLAY STAND

TECHNICAL SECTOR

The present invention concerns a display stand which is intended to be advantageously used for supporting articles of various kinds, such as, for example, panels, advertising signs or also products of any type such as mechanical or electronic products (e.g. circuit boards), alimentary articles, hydraulic and heat-engineering products or any other product, so as to allow easy display to the public of the product or service which is to be presented.

Therefore, the display stand in question is intended to be usefully used as a marketing instrument by any company which is interested in placing on display, publicising or presenting their products or services, particularly in locations or environments where their clients are present as well as at presentations, conferences, trade fairs, events, exhibitions, shows or also simply in shops.

More correctly, the invention falls within the sector of advertising which is otherwise known by the expression "POP displaying", which allows in particular mobile presentation or marketing of a product to be publicised.

BACKGROUND ART

At present, alongside display stands which are designed and produced ad hoc on a small scale in order to support specific products, various models of display stands of the modular type are known and may be easily transported so they can be rapidly assembled at the desired exhibition site for the presentation of articles or services.

These display stands may consist of simple supports for advertising panels or banners or may be formed by more complex structures, with a column, wall or stand-like form or being varyingly configured so as to support by means of support surfaces, shelves or simple hooking members the articles to be presented.

Known examples are simple column-like display stands, in particular for distributing brochures (brochure stands), which are formed by a support column on which one or more brochure holders are removably fixed (FIG. 17A).

In accordance with the example in FIG. 17B, display stands formed by two columns c having, formed between them, a framework i forming a wall for supporting an advertising panel or banner t, are also known.

The columns c rest on the ground by means of special feet p and are preferably made of several parts which are joined together by connecting elements e. The latter (see FIG. 17C) are inserted inside grooves in the bottom part of the column c' to which they are fixed by means of at least one pin a and are able to be inserted by means of engagement inside the top part of the column c".

This display stand may be arranged, once disassembled, inside a suitcase for easy transportation.

This display stand has the drawback that it envisages not particularly practical assembly of the columns and offers little versatility for forming different configurations and creating different advertising areas.

The manufacturers of display stands on the one hand are required to produce a support structure for display stands which is as far as possible standard for all the models of display stand, in order to limit the number of production parts and the warehouse stocks, and on the other hand need to satisfy the specific requirements of the client companies by providing specific solutions for the display of specific products.

The display stand market is aimed at a large number of very different companies who require a large variety of display stand models which are personalized for the individual product, but each of which is required for a limited number of items.

With the display stand design described above and with those which are currently available on the market it is possible to provide in a simple and practical manner only a few configurations and therefore it is possible to satisfy the requirements of only a well-defined clientele, unless the model and therefore the display stand structure are changed.

As mentioned above, various companies have placed on the market their own range of display stands, each of which is able to provide a specific spatial configuration and consequently satisfy a specific need to display a product or service.

For this purpose, various solutions have been proposed: column display stands (FIG. 17D), booth-like display stands with a support surface (FIG. 17E), banner or magazine display stands (FIG. 17F) or display stands with other forms suitable for mobile marketing able to interact with a specific target clientele in order to promote a given product or service in sales environments, in public spaces, at trade fairs or during particular events.

In order to achieve these different configurations, the display stands of the type known hitherto often use structural parts which generally have a tubular shape (see FIG. 17G) which can be connected together in a varying manner by means of joints of the type described in the U.S. Pat. No. 4,637,180 or which use metal profiles which are provided externally with grooves inside which it is possible to engage easily, in a retaining relationship, engaging parts able to support the products or act as a connection for other structural parts.

FIG. 17H shows a cross-section through a profile of a display stand of the known type with a gripping element Z engaged inside two grooves S provided.

Therefore, the display stand solutions known hitherto, in addition to having fairly high production costs, are difficult to use in a versatile manner in order to provide configurations which are able to display products and services which are different from each other and with different presentation requirements.

Moreover, all the solutions presented hitherto have proved to be not very practical, difficult to assemble and disassemble, difficult to transport and with excessively large dimensions.

DISCLOSURE OF THE INVENTION

The main object of the present invention is therefore to eliminate the drawbacks of the prior art mentioned above by providing a display stand, which can be assembled and disassembled simply and rapidly.

Another object of the present invention is to provide a display stand which is able to provide configurations able to present products or services of a different type in a very versatile manner.

Another object of the present invention is to provide a display stand which is not bulky and can be easily transported.

Another object of the present invention is to provide a display stand which is simple and inexpensive to produce.

Another object of the present invention is to provide a display stand which is constructionally entirely reliable.

Another object of the present invention is provide a display stand which allows the products to be displayed in an optimum manner, providing them with the maximum visibility required.

Owing to the lightness of the support structure and the practical way with which it may be assembled and fitted together, the display stand according to the invention is particularly suitable for use in the area of mobile marketing where a product is promoted accompanying the client to a location where it is easier to conclude the sale.

BRIEF DESCRIPTION OF THE DRAWINGS

The technical characteristics of the invention, in accordance with the abovementioned objects, may be clearly determined from the contents of the claims indicated below, and the advantages thereof will emerge more clearly from the detailed description which follows provided with reference to the accompanying drawings which show a purely exemplary and non-limiting example of embodiment thereof, in which:

DETAILED DESCRIPTION OF A PREFERRED EXAMPLE OF EMBODIMENT

Figure 1:
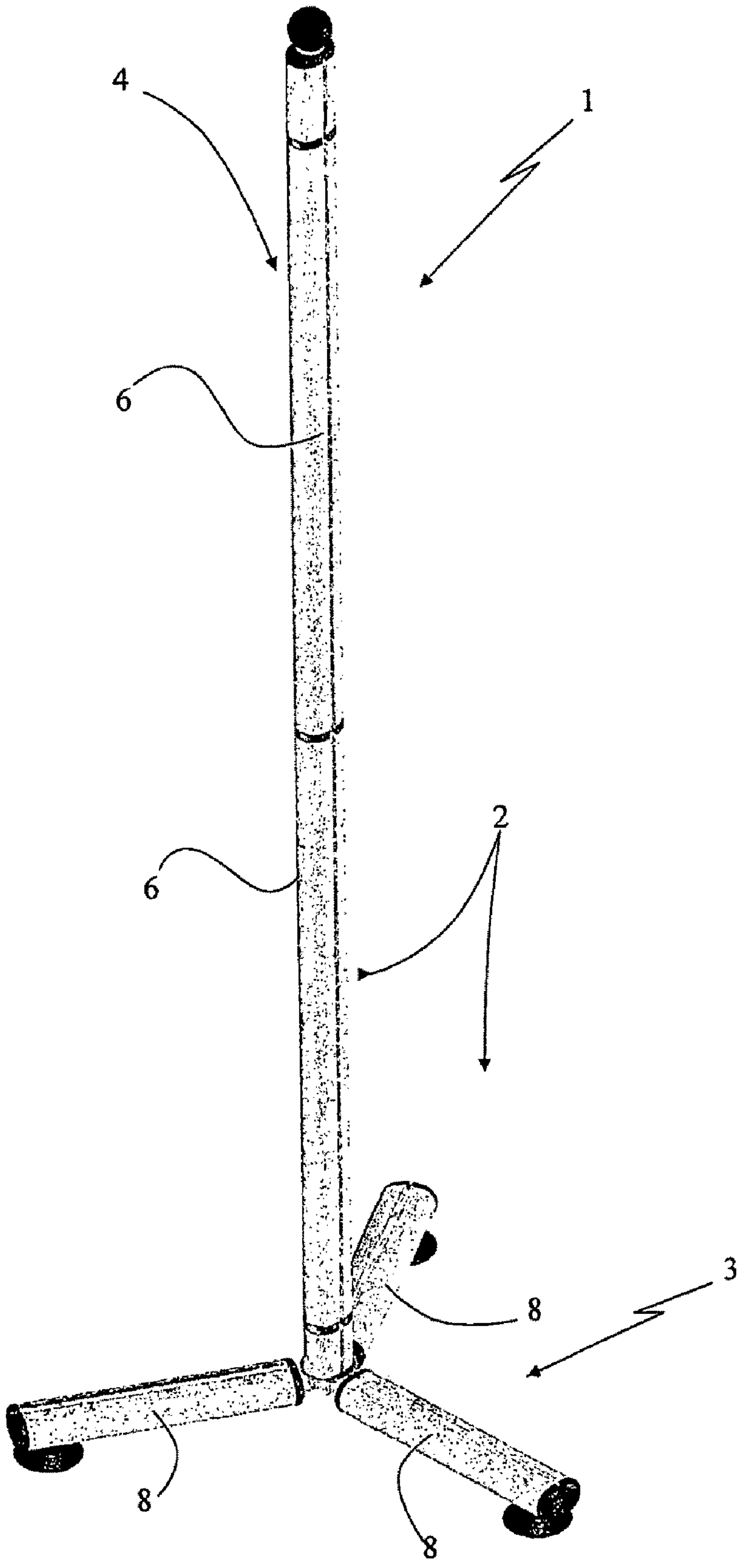
FIG. 1 shows an overall perspective schematic view of a first example of embodiment of a single-column display stand according to the present invention.

With reference to the accompanying drawings, 1 denotes in its entirety the display stand according to the present invention.

In accordance with the example of embodiment shown in the accompanying figures, the display stand 1 has a support structure—denoted generally by 2—formed by a support base 3 and by a frame which extends heightwise by means of one or more columns 4 and which extends widthwise by means of one or more cross-members 5.

As will be explained below, each column 4 is formed by one or more modular profiles 6 which are connected together continuously by means of first fixing means 7 which will be described below.

Figure 2:
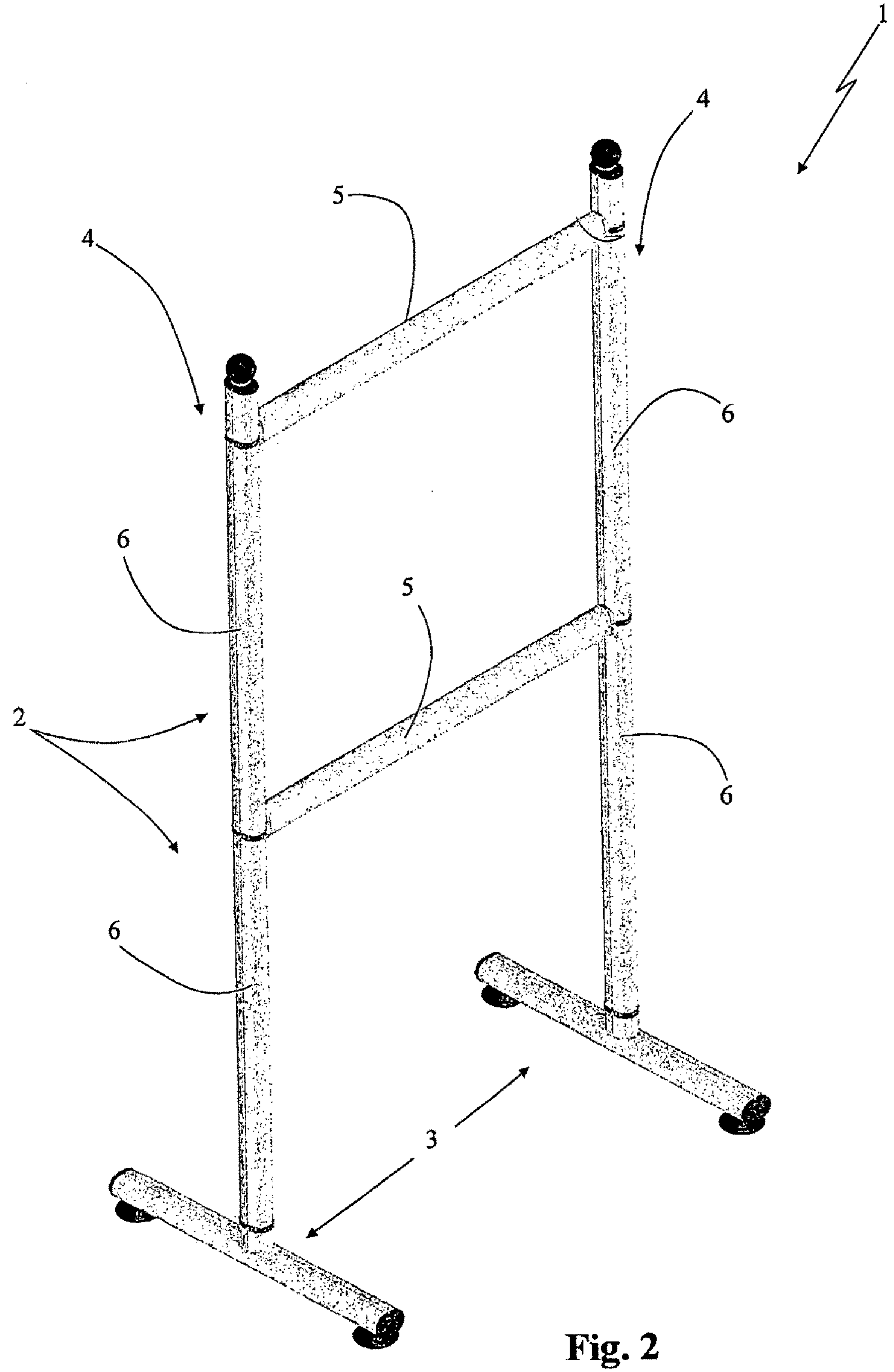
FIG. 2 shows an overall perspective schematic view of a second example of embodiment of a two-column display stand according to the present invention.

FIGS. 1 and 2 show two examples of a display stand 1 according to the invention, the first one of which extends in the form of a single column 4, while the second one extends in the form of two columns 4 parallel to each other.

The modular profiles 6 which form the columns, as well as those which form the cross-members 5, are composed of extruded sections, which are preferably made of light metal such as aluminium, suitably shaped so as to allow the engagement of accessories which will complete the configuration of the individual display stand in accordance with requirements determined by the product or service to be publicised.

In greater detail, the support base 3 consists in the first case of a tripod which is formed by three separate feet 8, each of which is hinged at one end by means of a fork member 9 laterally on a flange 10 which is arranged in radial fashion and fixed to a central body 80 arranged so as to close the bottom end of the column 4.

In the region of the flanges 10, each foot 8 will have the modular profile 6 provided with incisions so as to allow its rotation about the hinge and be able to vary between an open configuration for supporting the display stand 1 and a stowed away compact position where it is situated close to the column 4.

The other end of each foot 8 is closed by a blind plug 11, while an adjustable foot 12 is provided for resting on the ground, formed by means of a threaded screw with, fixed at its end, a widened plastic portion.

The other end of the screw engages inside a counter-threaded bush which is retained inside a hole in the profile of the foot 8.

In the example according to FIG. 2 with the display stand 1 comprising two columns 4, the support base 3 may be formed in a manner similar to the previous example simply by providing two feet arranged at 180° instead of three feet arranged radially at 120°.

Alternatively, the support base according to the example of FIG. 2 may be formed with a unitary profile extending over the length of the two opposite feet 8, with two blind plugs 11 at the ends and two adjustable feet 12, and supporting in the middle position first fixing means 7 for defining engagement with the profile 6 of a column 4 as will be better explained below.

In any case, the feet 8 are of a suitable length for avoiding dangerous toppling over of the display stand 1 following variations in the position of the centre of gravity or as a result of the display of heavy products and may be advantageously provided, in the underlying part, with wheels for transportation on the ground.

The feet 8 may form, together with the central fixing means, the base profile for connecting a column 4 formed by a single vertical profile 6.

Obviously, the display stand structure with two columns 4, like that with a single column 4, may be repeated or suitably connected by means of cross-members 5 which are suitably directed so as to form display stands 1 having a wall with the desired width or with the desired extension.

Figure 9:
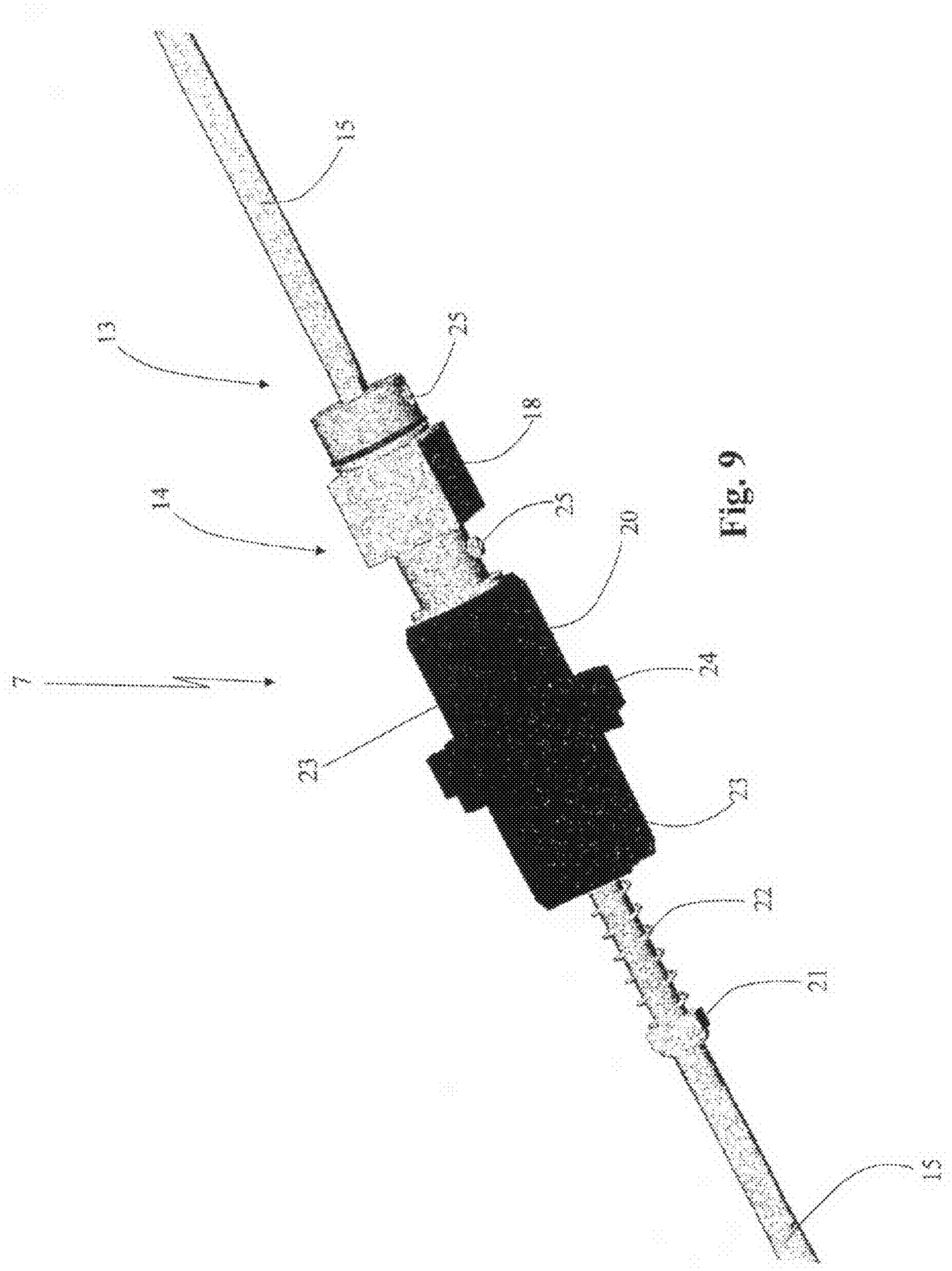
FIG. 9 shows a further view of the detail of the preceding figure with various parts removed so that other parts may be seen more clearly.

The first fixing means 7 (see FIG. 9) for connecting in series two or more modular profiles 6 so as to obtain columns 4 of varying heights, envisage according to the invention a male part 13 and a female part 14 associated with two adjacent profiles 6 which can be connected together in succession by means of fast-fit engaging means.

The expression "fast-fit engaging means" must be understood as meaning means for engaging the male part and female part together, where the two parts are removably displaceable between a position where they are free and disengaged from each other and a position where they are coupled together, resiliently yielding means being envisaged for the transition from the free position into the mutually coupled position.

These fixing means 7 described with reference to the columns may also be similarly used for connecting the bases to the uprights and for increasing the dimensions of the cross-members, as will explained more clearly below.

Figure 6:
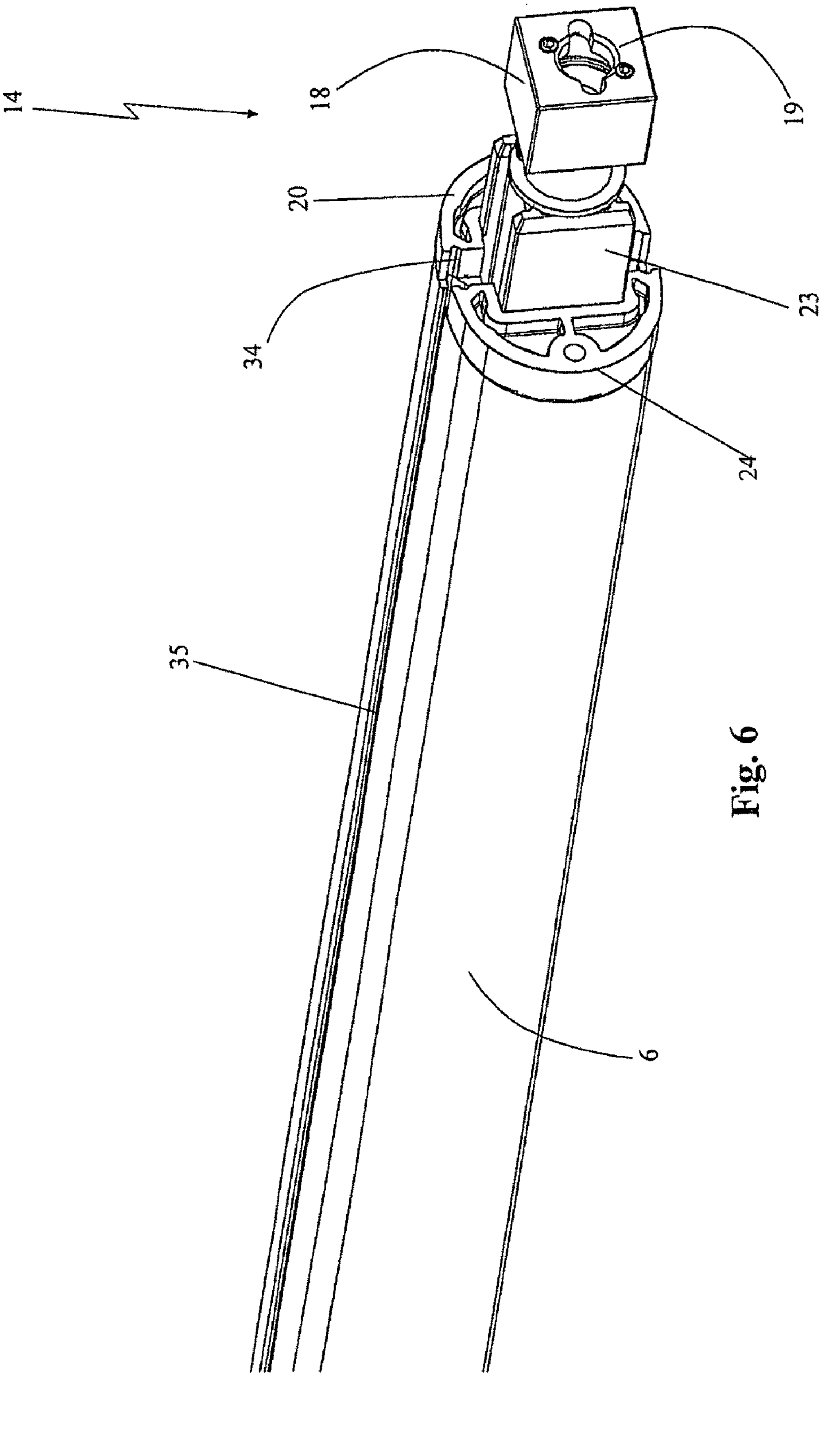
FIG. 6 shows a perspective view of a detail of the display stand, relating to a first portion of a column with some parts removed so that other parts may be seen more clearly.

In greater detail, each modular profile 6 has, axially inserted internally, a rod 15 which carries, fixed at the bottom end, the male part 13 (see FIG. 7) in the form of an arrow head with a shank 16 and enlarged head 17 and at the top end the female part 14 (see FIG. 6) formed with a hollow body 18 provided at the top with an eyelet 19 able to receive the enlarged head 17 of the male part 13.

Figure 8:
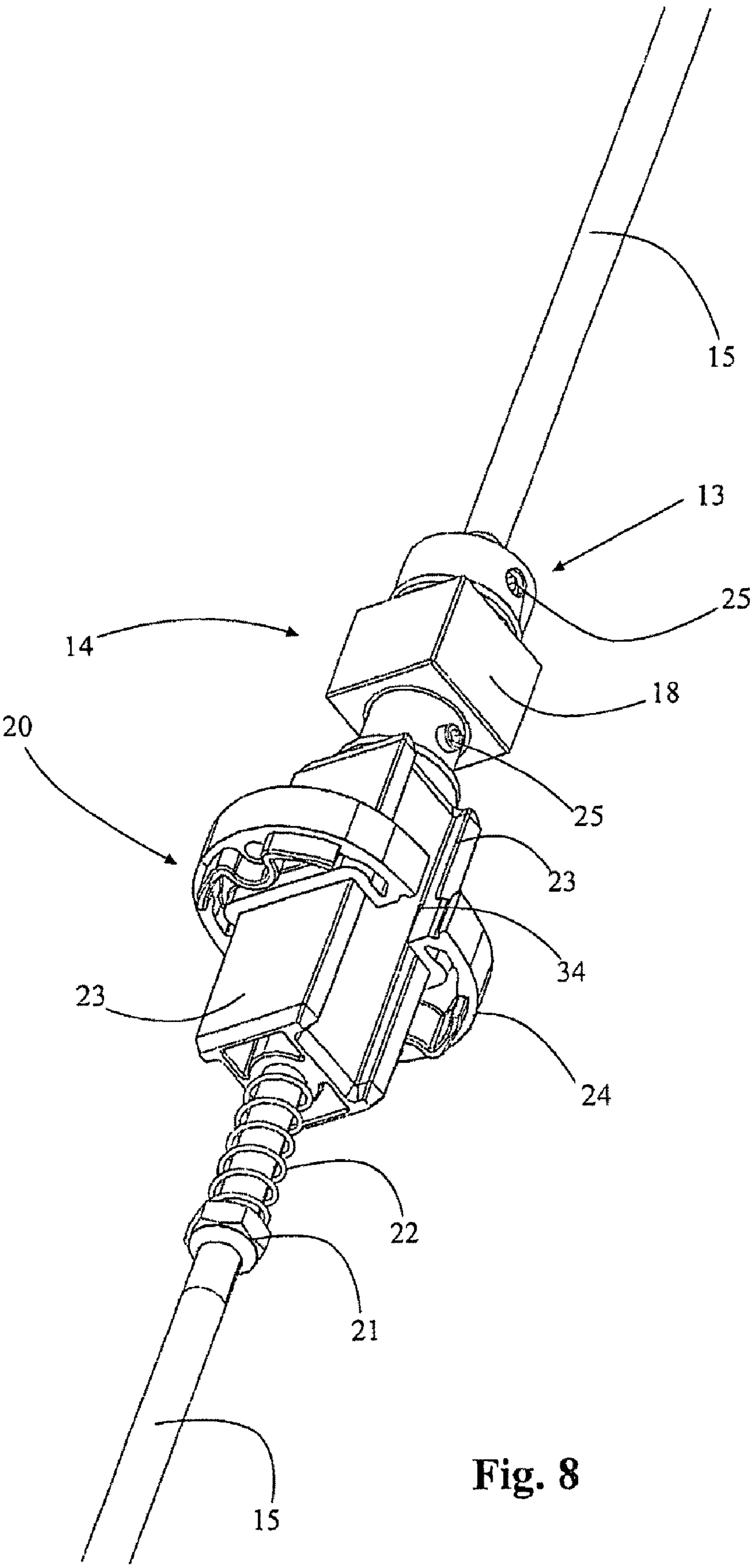
FIG. 8 shows a perspective view of a detail of the display device, relating to connection of the two column portions according to FIGS. 6 and 7.

The rod 15 may slide partially inside a connection fitting 20 which is made of plastic and sealingly arranged between the two modular profiles 6 to be joined together, being however constrained by the action of a spring 22 as clearly illustrated in FIG. 8. On the other side of the fitting 20 a bearing ring 21 is provided close to the end of the rod 15 with which the female part 14 is associated, so as to receive, pressing against it, the end of a spring 22 which is mounted coaxially on the rod 15 between said ring 21 and the bottom profile of the fitting 20.

The rod 15 has, fixed to its top end, on the opposite side to the ring 21, relative to the fitting, 20, the female part 14 which prevents the rod 15 from being extracted under the thrust of the spring 22.

Functionally speaking, once the two modular profiles 6 have been coupled together, the male part 13 is pushed downwards so that a force applied to the female part 14 causes compression of the spring 22, albeit by a minimum amount and only sufficient to overcome the play. The rotation of the male part 13 with respect to the fixed female part allows the enlarged head 17 to be snap-engaged inside the eyelet 19 of the hollow body 18 of the female part 14.

The female part 14 is prevented from rotating since the hollow body 18 with a parallelepiped form engages snugly inside a seat with a matching shape formed in the profile 6 which is fixed.

Advantageously, insertion of the male part 13 inside the female part 14 is guided by a receiving surface on the mouth of the eyelet 19 which causes a rotation of the male part 13 with respect to the axis of the rod 15.

The rod 15 is free to rotate with respect to the fitting 20 to which it is constrained only by means one or more springs 220. In greater detail, two springs 220 are envisaged, acting between the connection fitting 20 and the hollow body 18. For this purpose seats 700 and 701 are envisaged, said seats facing each other and being respectively arranged in one side 702 of a cylindrical body 703 to which the female part 18 is connected and in the upper side of an elongated portion 23 of the connection fitting 20. By means of a comparison with FIG. 16 it is possible to note a female thread 502 considered in detail below is formed in the cylindrical body 703.

The rotation, during engagement by means of the two profiles, occurs with the male part 13 guided by the eyelet 19 of the female part 14 and is obtained by pushing a profile 6 onto the other profile and at the same time produces tensioning of the springs 220.

Figure 15:
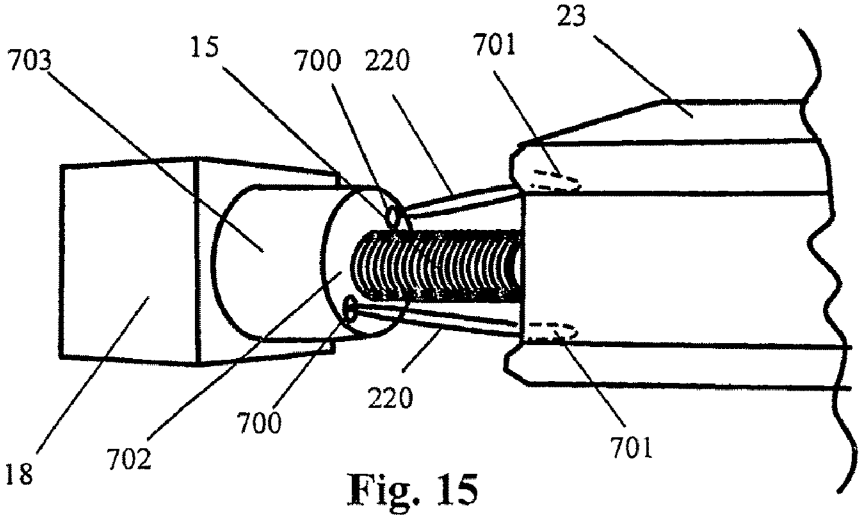
FIG. 15 shows a perspective view of a detail of the display stand according to the invention, relating to a female part of fixing means.

Each spring 220 engages with one end inside a hole formed in the end side of the cylindrical portion of the hollow body 18 and with the other end inside a seat of the plastic connection fitting 20, as shown in FIG. 15.

As soon as the male part 13 has passed over the eyelet 19 and entered into the hollow body 18 of the female part 14, the spring 220, previously tensioned, will release its torque producing a counter-rotation of the male part 13 so as to bring the latter into an offset position with respect to the eyelet 19 able to retain it inside the hollow body 18.

Obviously, the spring 220 may be positioned in another position provided that it is able to perform the same function.

The spring 22 mentioned above may advantageously be tensioned axially owing to the play with which the rod 15 is retained so as to accompany gradually insertion of the male body inside the female body, overcoming problems of tolerance.

The twisting torque produced by the spring 220 may be alternatively produced by the same spring 22 which in this case will have one end fixed to the connection fitting 20 and the other end connected to the rod 15.

The fitting 20 for connecting together the abovementioned two profiles 6 has two elongated portions 23 which extend in opposite directions and have a form with a quadrangular shape so as to allow stable engagement in the correspondingly shaped quadrangular seat of the profile 6. A visible widened portion 24 is envisaged between the two elongated portions 23 and extends transversely following substantially the outer contour of the profile 6.

Both the female part 14 and the male part 13 are connected to the ends of the respective rods 15 by means of female-thread/screw connections and the relative positions are determined by means of the engagement of grub screws 25. Alternatively, fixing of the parts 13 and 14 on the respective rods 15 may be performed by means of engagement of through-pins inside coaxial holes provided on the parts 13 and 14 and on the ends of the rods 15.

The last modular profile 6 (see FIG. 10) may envisage a knob or handwheel 26 which can be easily gripped and is fixed to the top end of the last rod 15. By pressing the abovementioned knob 26 downwards and rotating it simultaneously, the individual modular profiles forming each column 4 may be fixed to each other. The said knob 26 may then be fixed in position by means of a key 27 consisting for example of a wing nut with a threaded brass bush for screwing onto the end of the rod 15 until the knob 26 is locked in position.

The end of the profile 6 is in this case no longer associated with a connection fitting 20, but with a closing lid 28 with a central hole for receiving the rod 15.

In accordance with a preferred embodiment of the present invention the knob 26 will have the form described in the drawings 10B, 10B', 10C, 10C' where it has been indicated by 26 and 26". The knob is free to rotate above a closing lid 28', 28".

Figure 3A:
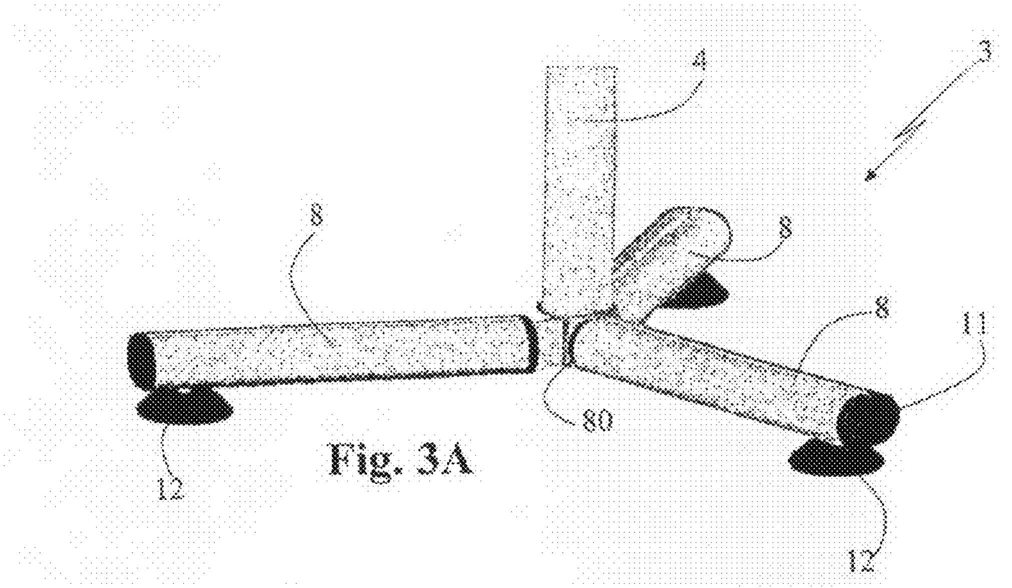
FIGS. 3A,3B,3C show a detail of the single-column display stand according to FIG. 1, relating to the support base, some parts having been removed in FIGS. 3B and 3C so that other parts may be seen more clearly.
Figure 3B:
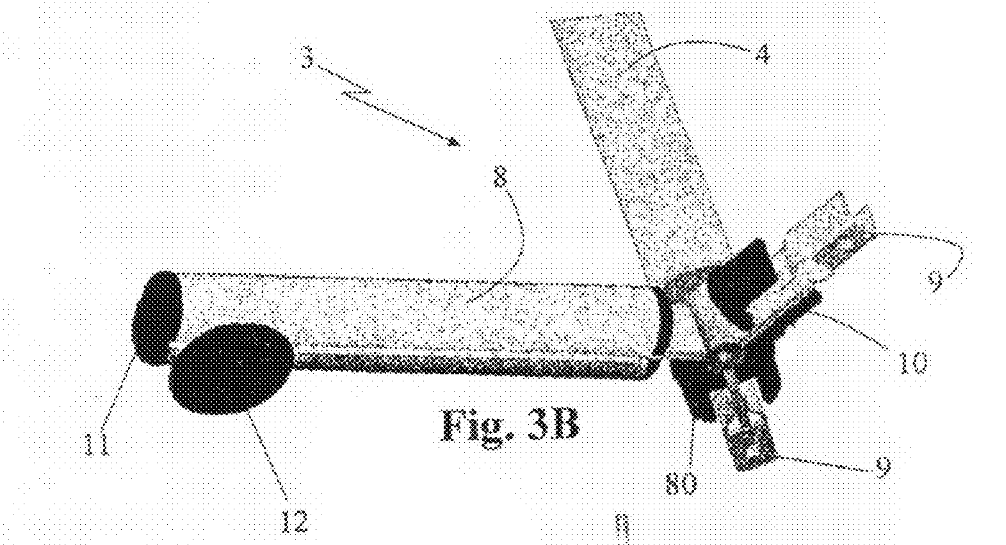
Figure 3C:
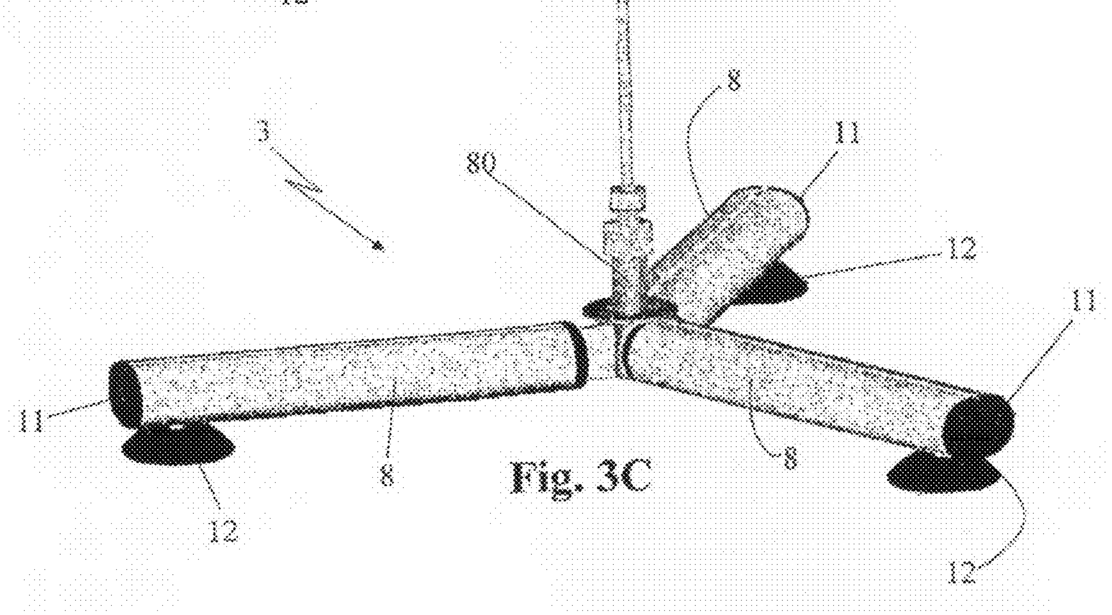
Figure 3D:
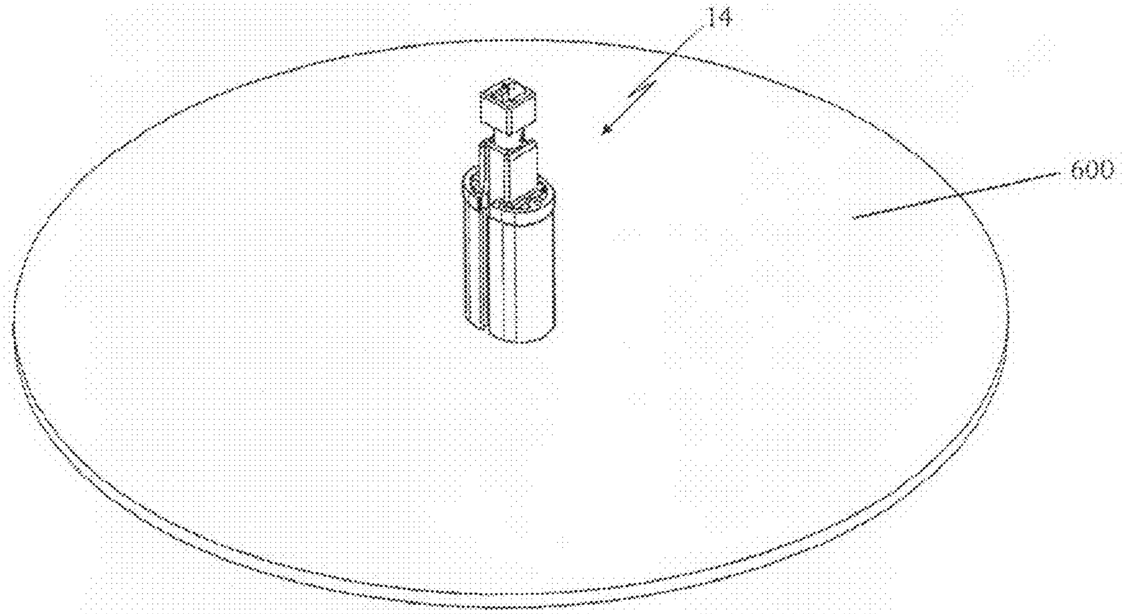
FIG. 3D shows a different support base for the display stand according to the invention.
Figure 4:
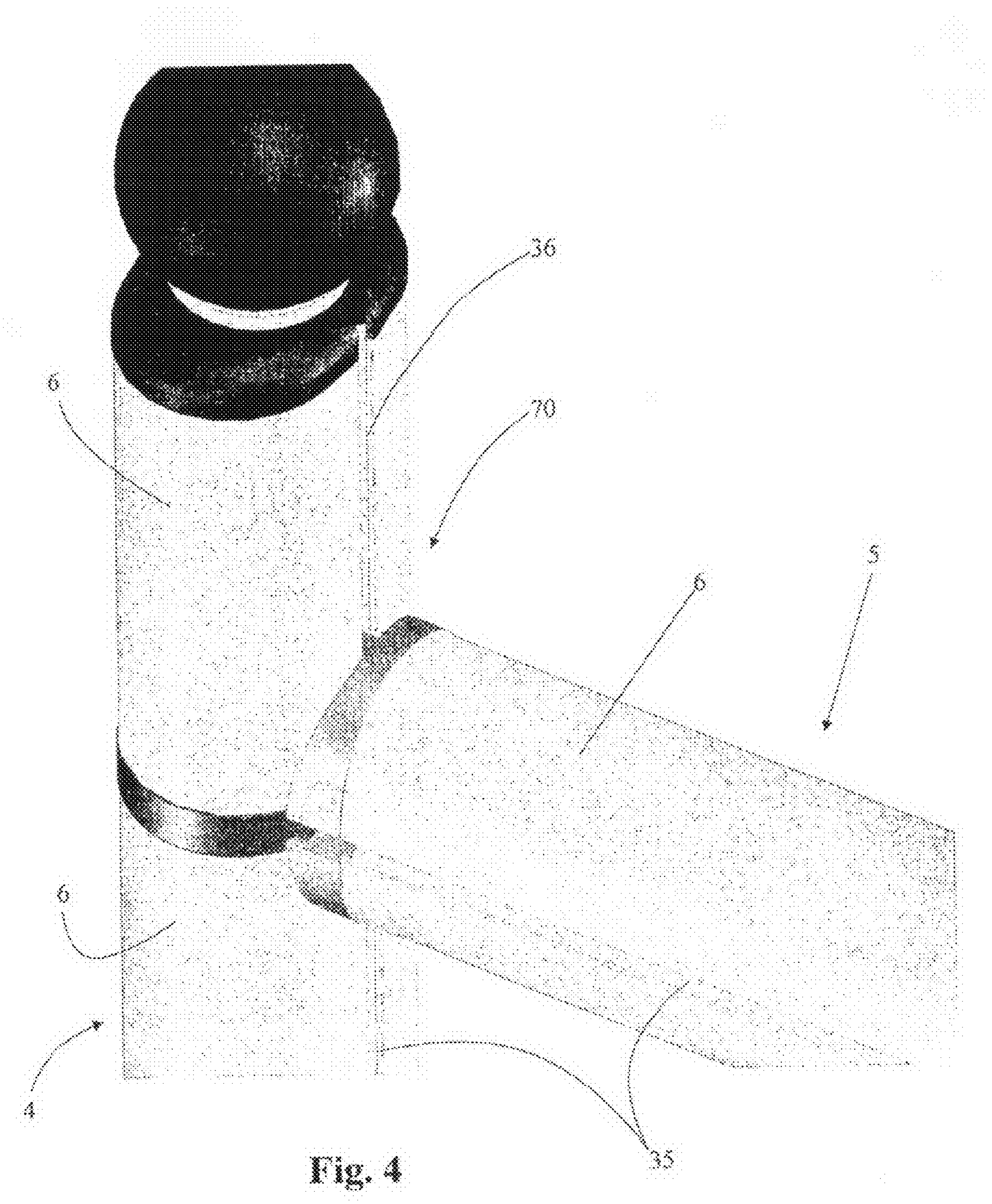
FIG. 4 shows a detail of the display stand according to the invention, relating to a column with a cross-member connected.
Figure 16:
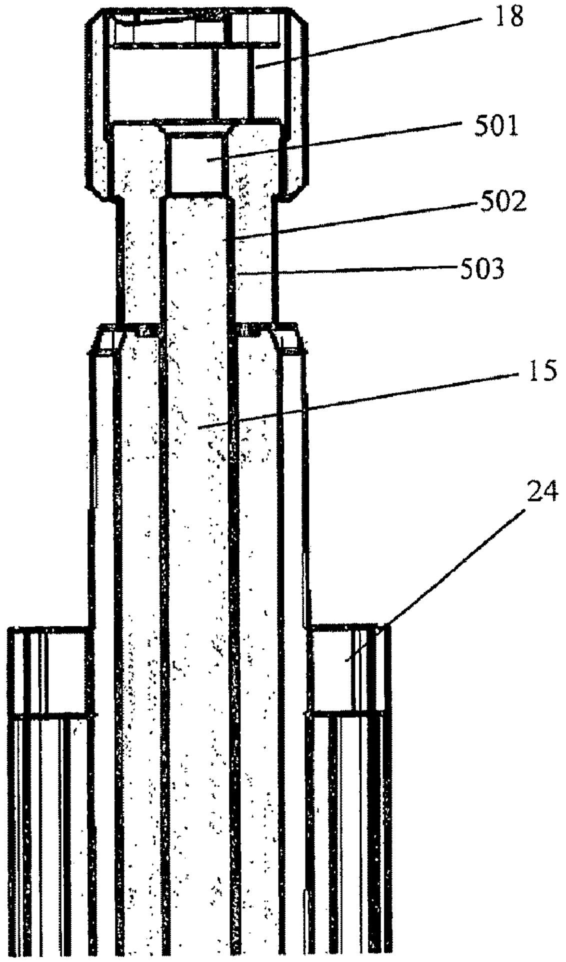
FIG. 16 shows a perspective view of a detail of the display stand according to the invention, relating to a male part of the fixing means.
Figure 17A:
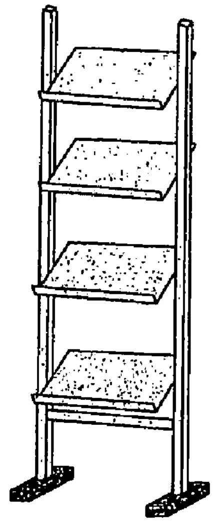
FIGS. 17A-17H illustrate various display stands according to the prior art.
Figure 17B:
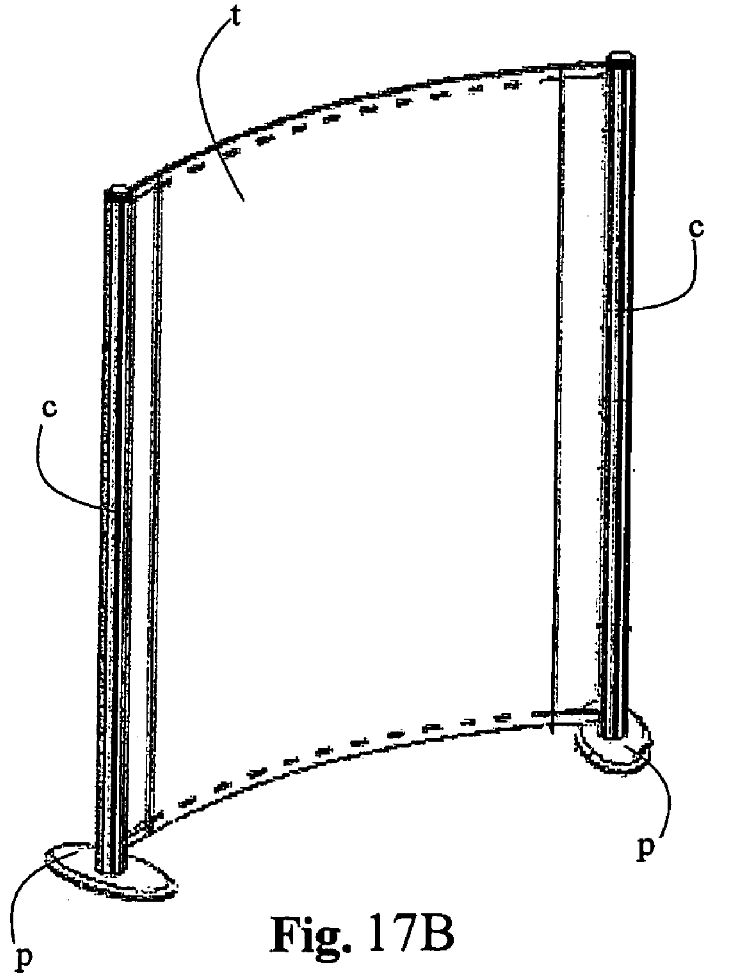
Figure 17C:
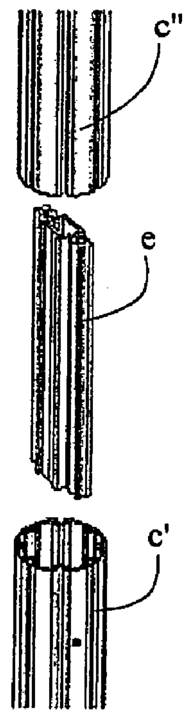
Figure 17F:
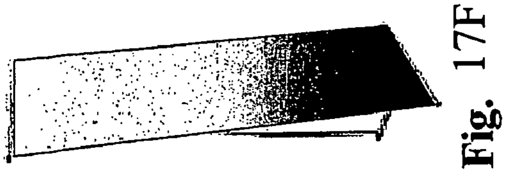
Figure 17H:
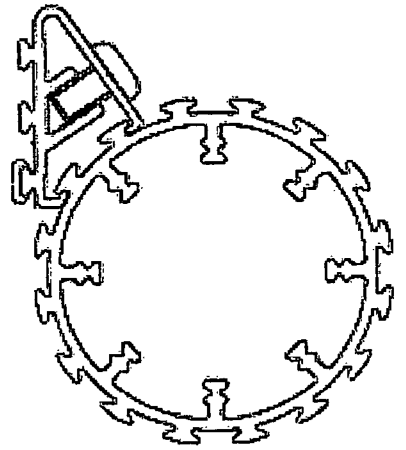
Figure 17E:
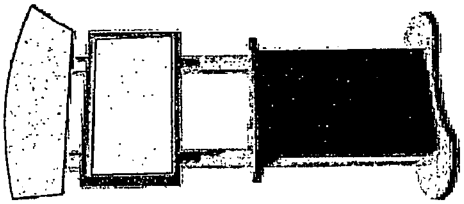
Figure 17G:
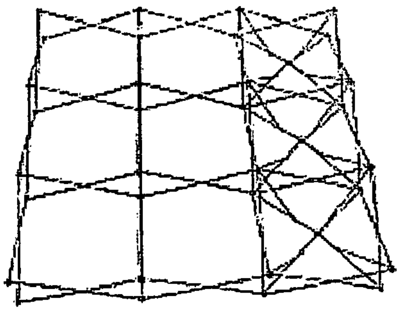
Figure 17D:
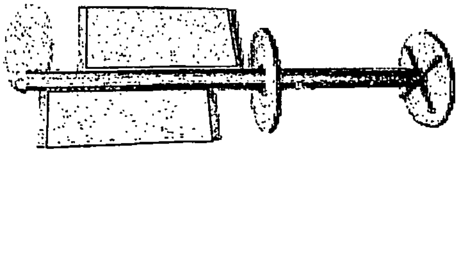

In accordance with this example, the rotation of the knob 26' and 26" will cause a rotation of a threaded tensioning rod 500 which engages by means of screwing inside the top part 501 of a female thread 502 formed in the hollow body 18 and not already engaged by the rod 15 which is screwed along the bottom section 503 of the female thread 502 (see FIG. 16 or 3D).

Figure 10A:
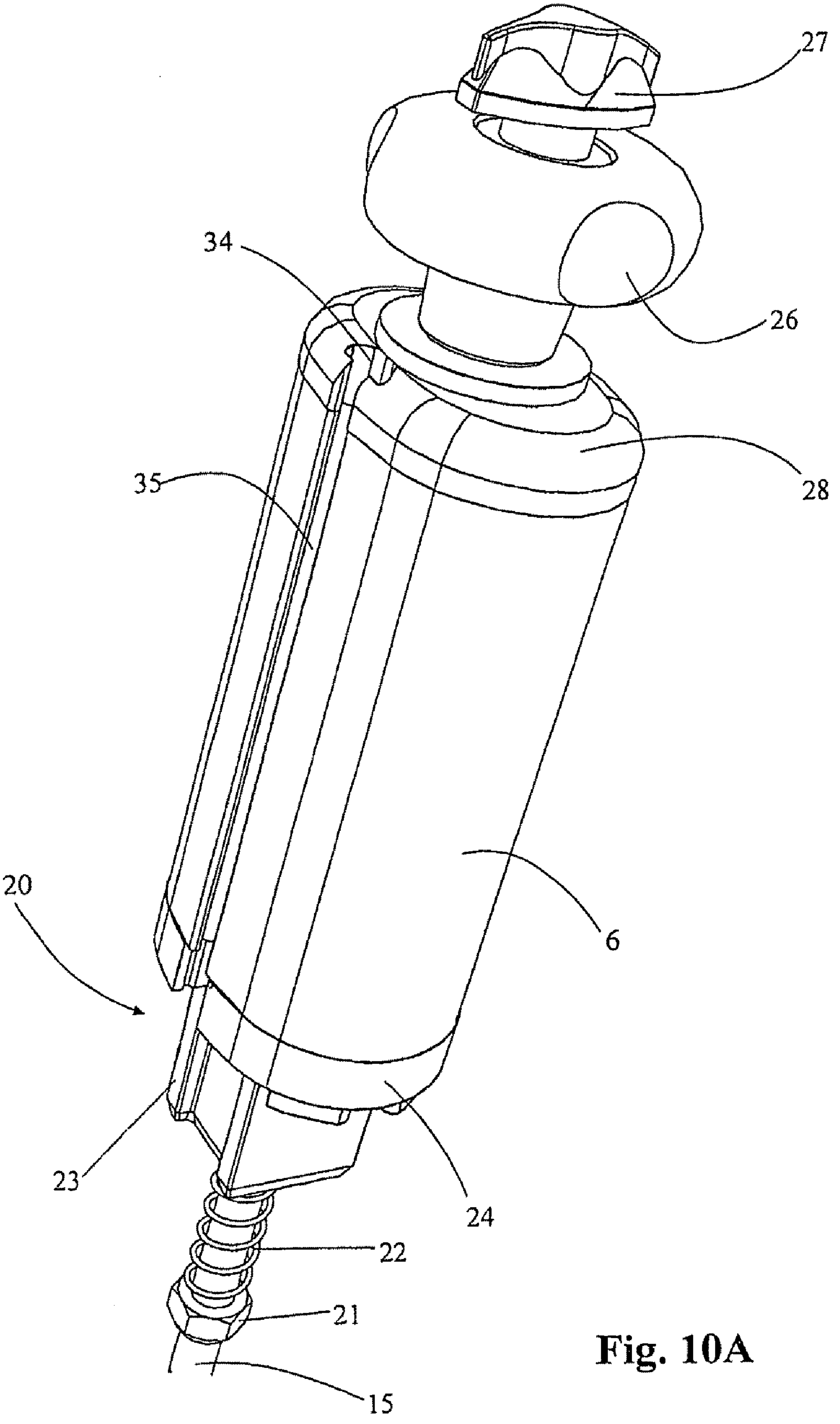
FIG. 10A shows a first perspective view of a detail of the display stand according to the invention, relating to an end portion of a support column with some parts removed so that other parts may be seen more clearly.
Figure 10B:
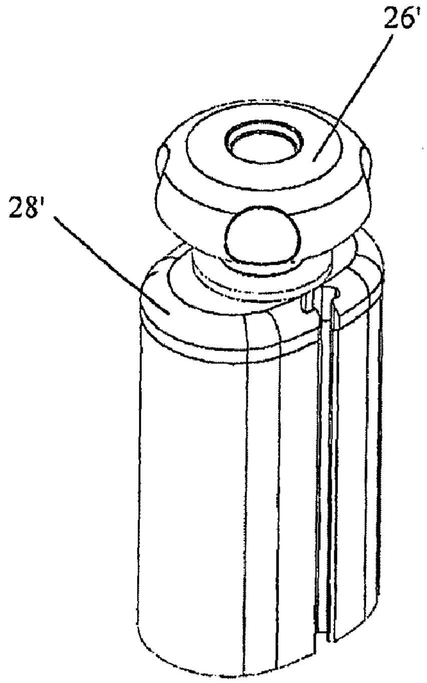
FIGS. 10B, 10B' show a perspective and cross-sectional view of a detail of the display device according to the invention, relating to a different end portion of a support column.
Figure 10B:
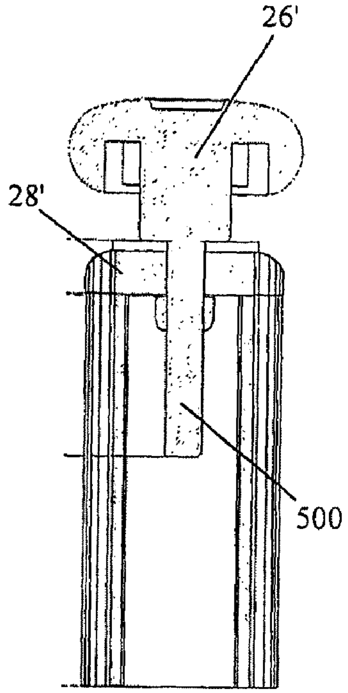
Figure 10C:
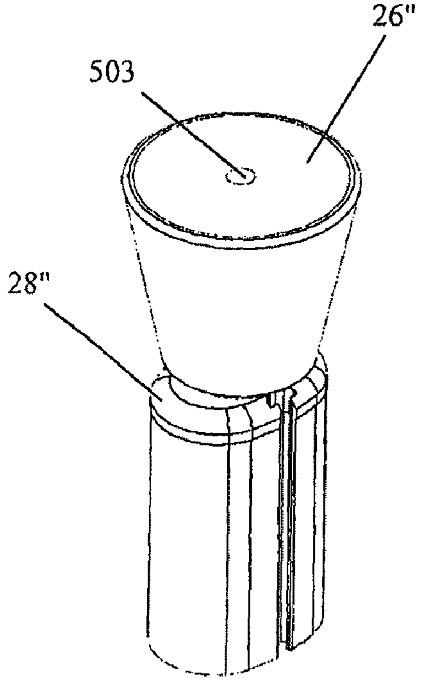
FIGS. 10C, 10C' show a perspective and cross-sectional view of a detail of the display stand according to the invention, relating to a different end portion of a support column.
Figure 10C:
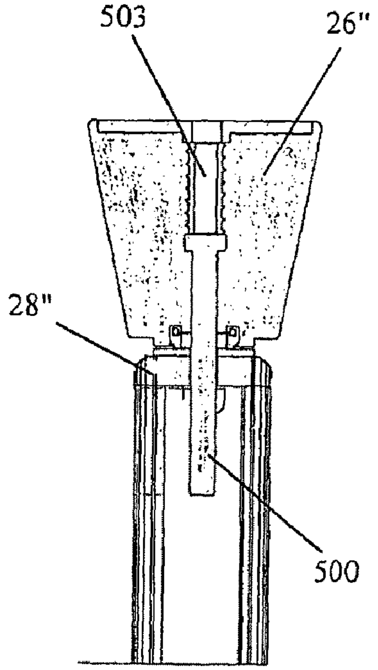
Figure 11:
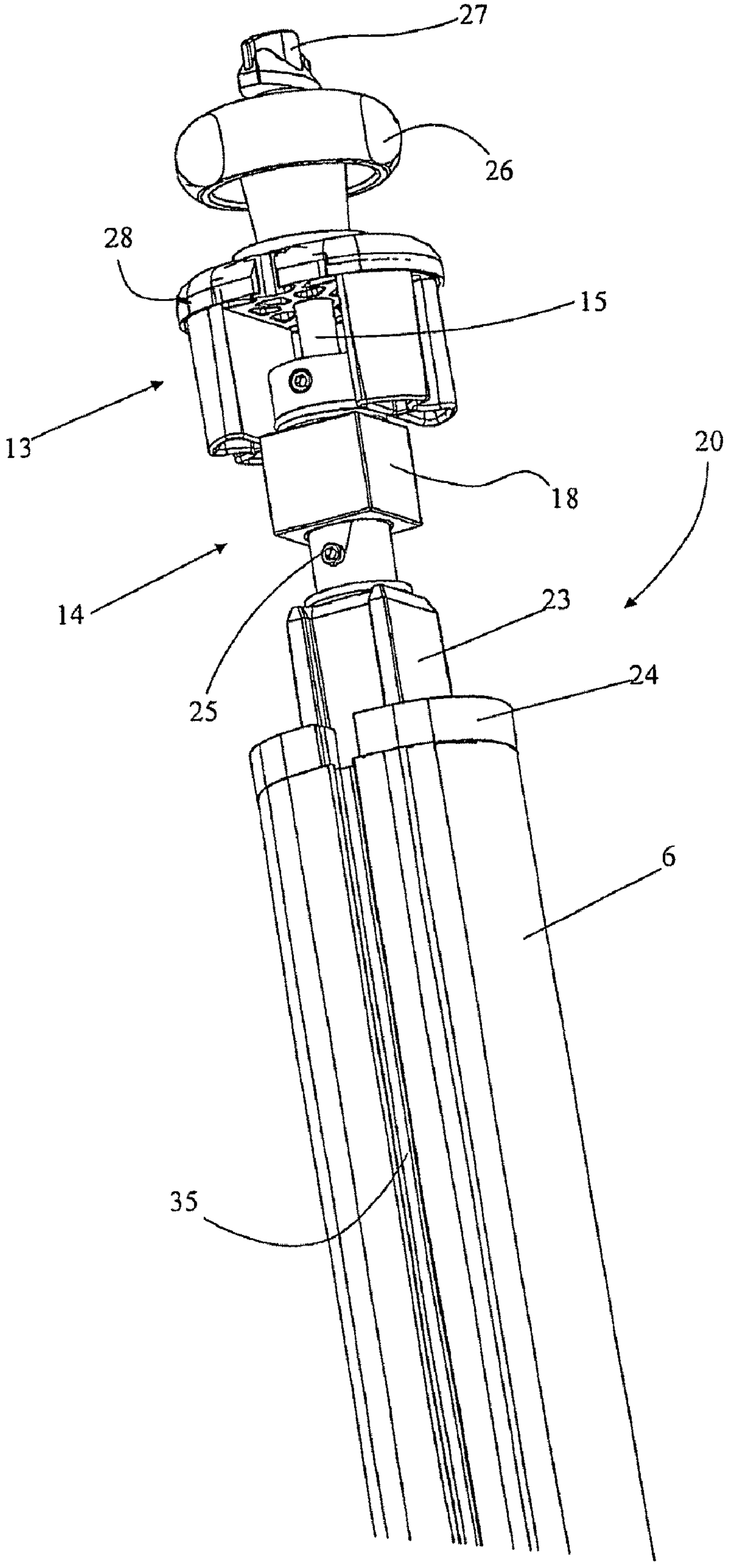
FIG. 11 shows a second perspective view of the detail of the preceding figure with some parts removed so that other parts may be seen more clearly.
Figure 12:
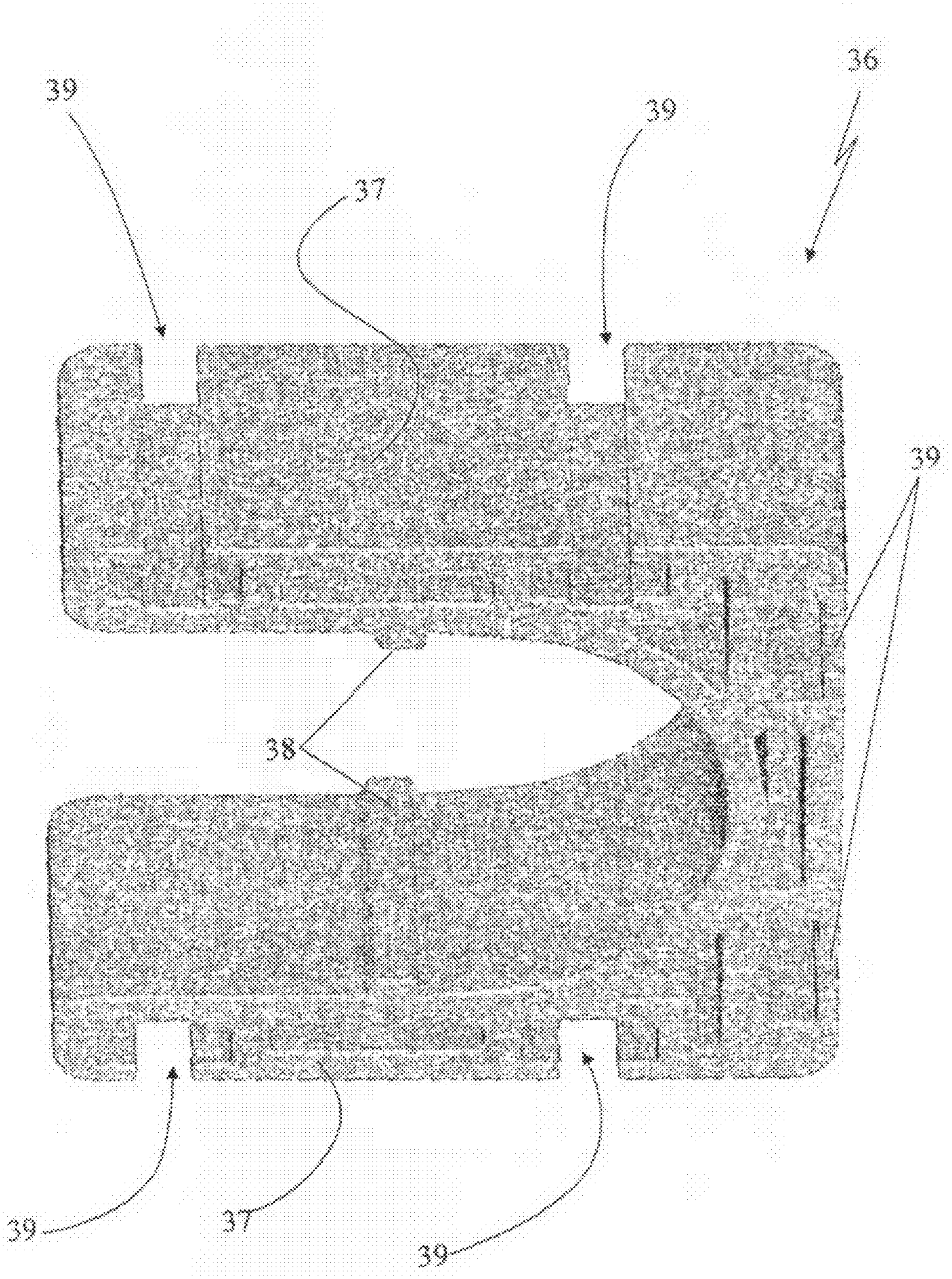
FIG. 12 shows a perspective view of a detail of the display stand according to the invention, relating to an engaging part.
Figure 13:
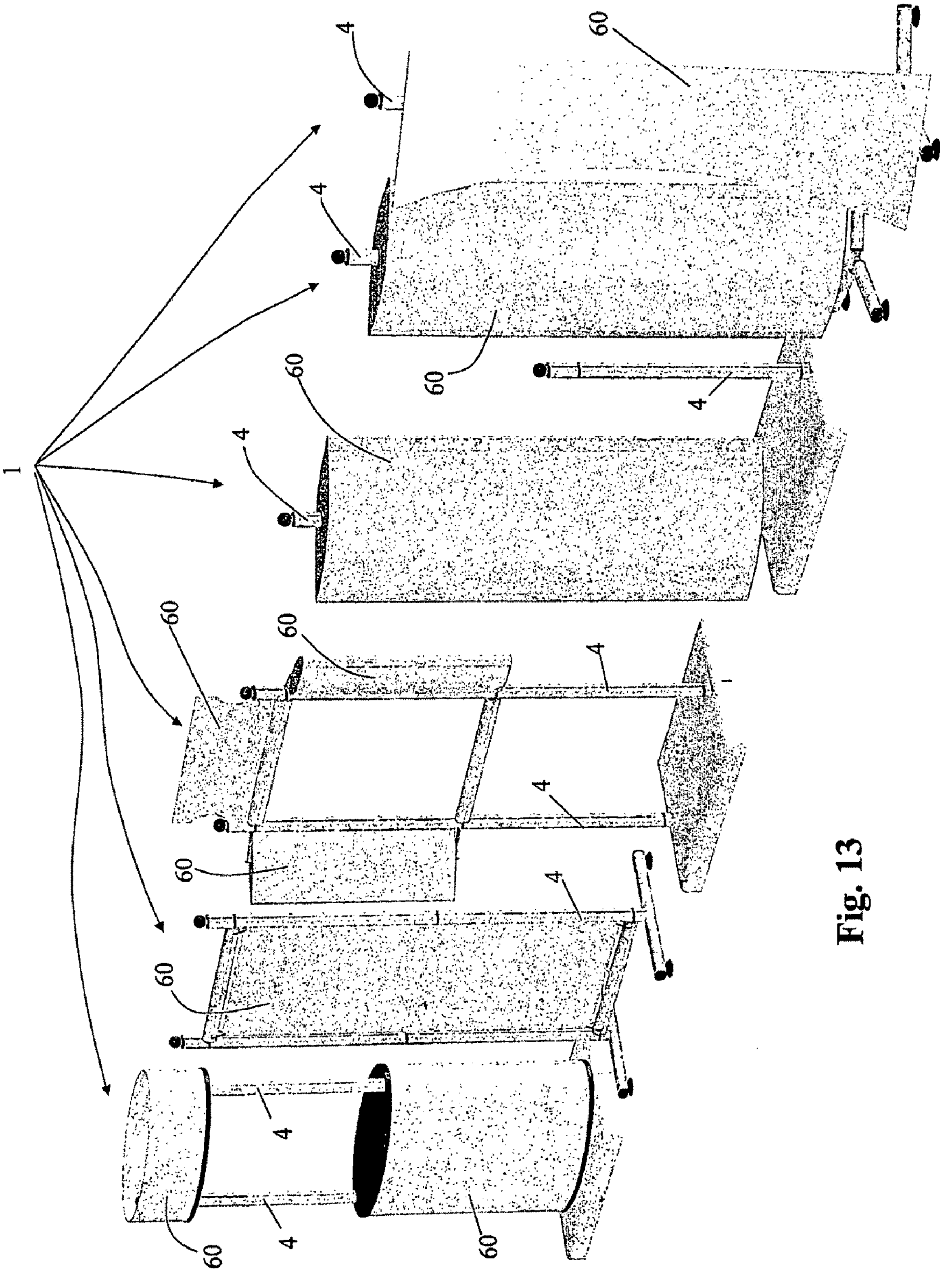
FIG. 13 shows some possible configurations which can be obtained by means of the display stand according to the invention.
Figure 14C:
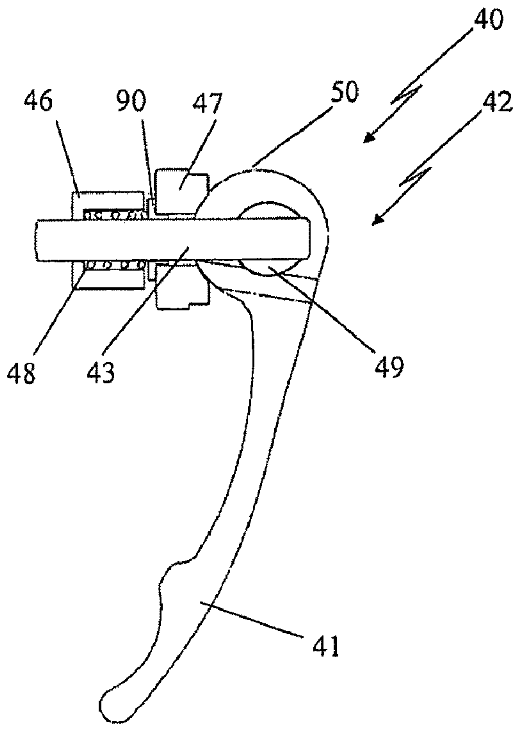
FIG. 14C shows a cross-sectional view of the engaging device according to FIG. 14A.
Figure 14A:
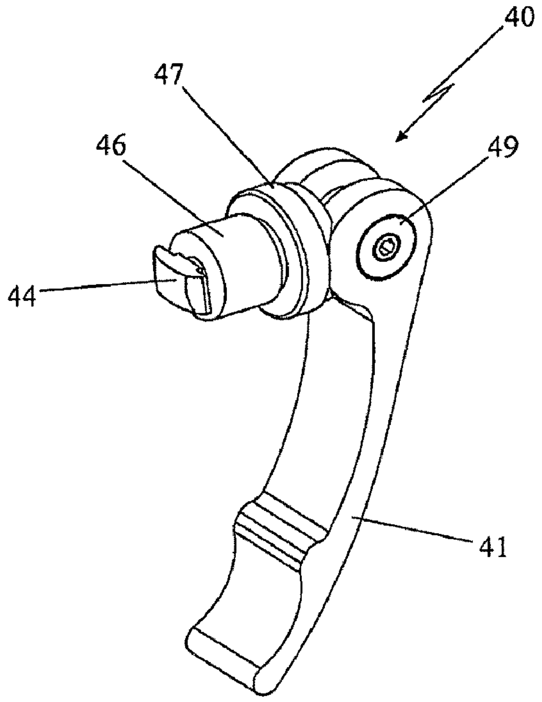
FIG. 14A shows a perspective view of a detail of the display stand according to the invention, relating to a further engaging device.
Figure 14B:
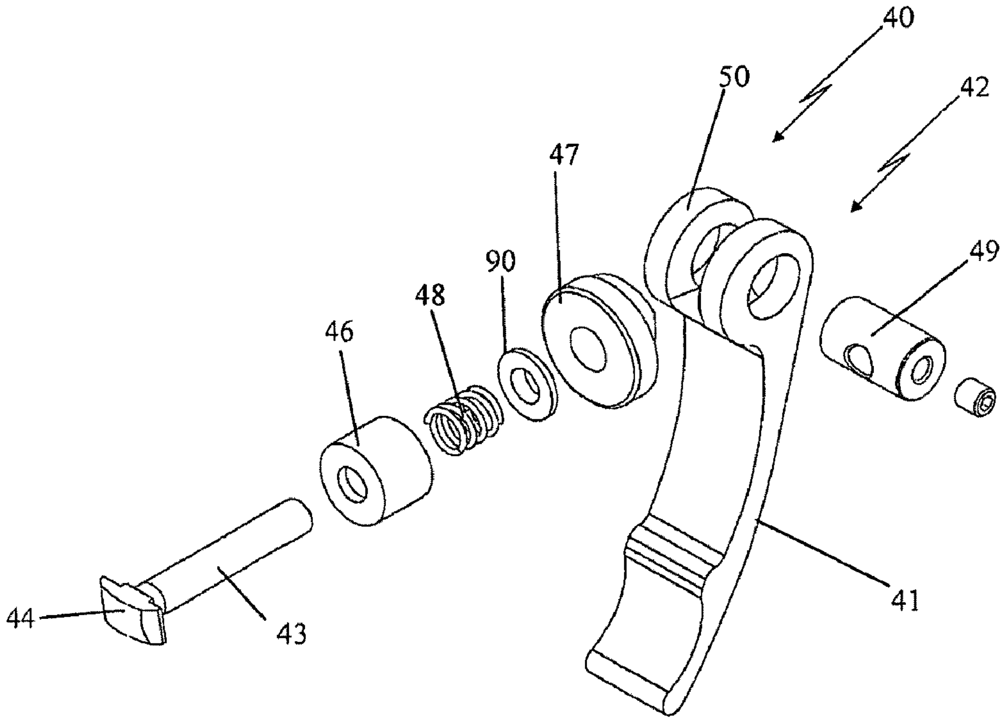
FIG. 14B shows an exploded view of the engaging device according to FIG. 14A.

In the case of the example shown in FIG. 10C, the knob has formed above it a female thread 503 for the engagement of further accessories or extensions provided with a screw having the same diameter and pitch.

Figure 7:
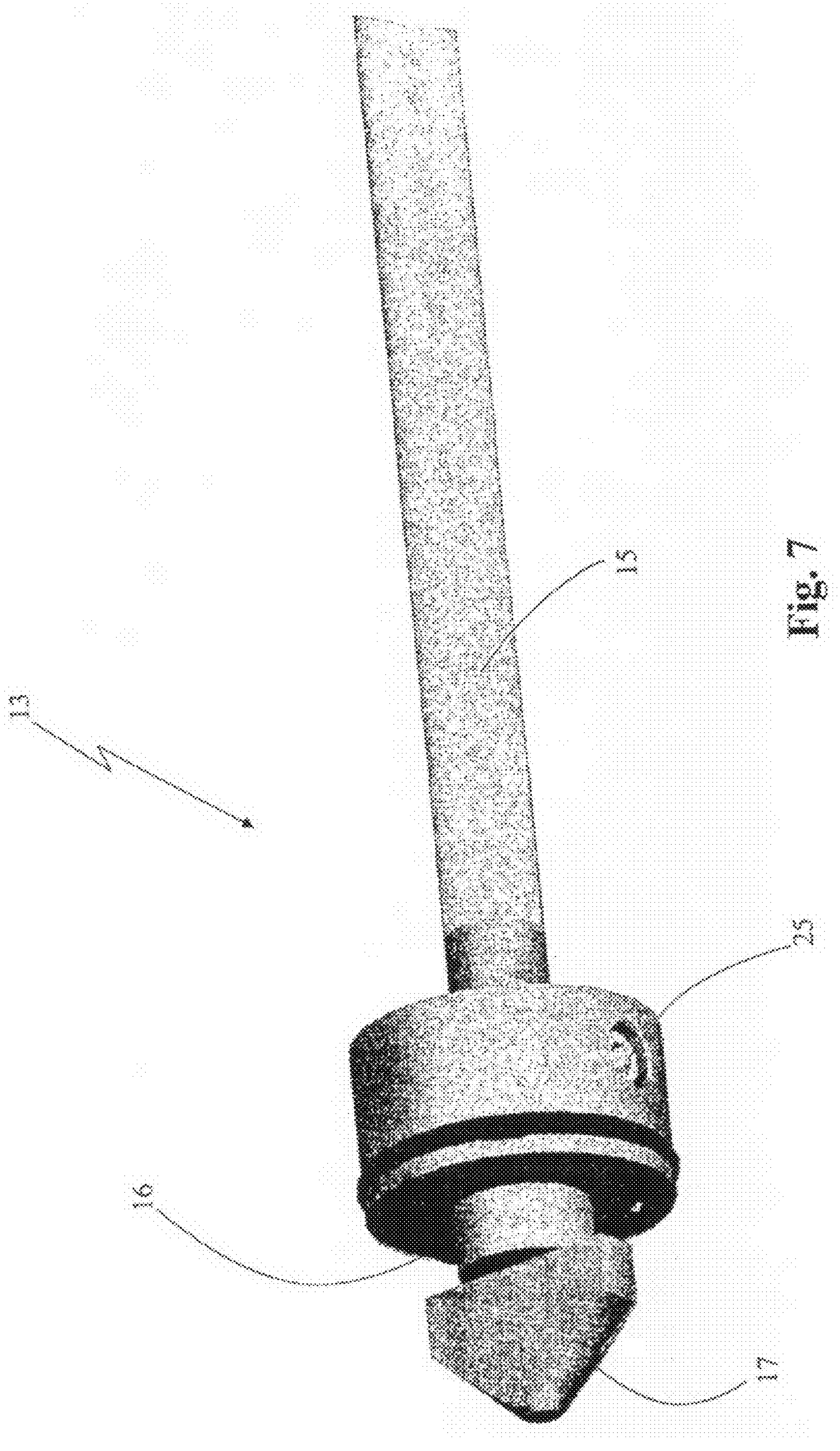
FIG. 7 shows a perspective view of a detail of the display stand, relating to a second column portion with some parts removed so that other parts may be seen more clearly.

In accordance with the detail shown in FIG. 3D, the female part 14 which extends upwards from the widened base 600 may be engaged with a male part 13 of a column profile 6 as described above and in particular with the bottom part provided with an arrow-shaped engaging head 17 of the type shown in FIG. 7. Obviously the male part is arranged inside its own profile 6 which also covers the female part 14 and the elongated portions 23 of the connection fitting 20, so as to form a continuous outer profile.

Alternatively, this female part 14 may be coupled directly by means of screwing with a column provided with a tensioning rod 500 of the type indicated in FIGS. 10B, 10C.

The cross-members 5, mentioned above, are connected, in the manner of shelves, between the columns 4 by means of second fixing means 70. They are formed with a profile 6 advantageously entirely identical to that used for formation of the columns 4.

Figure 5A:
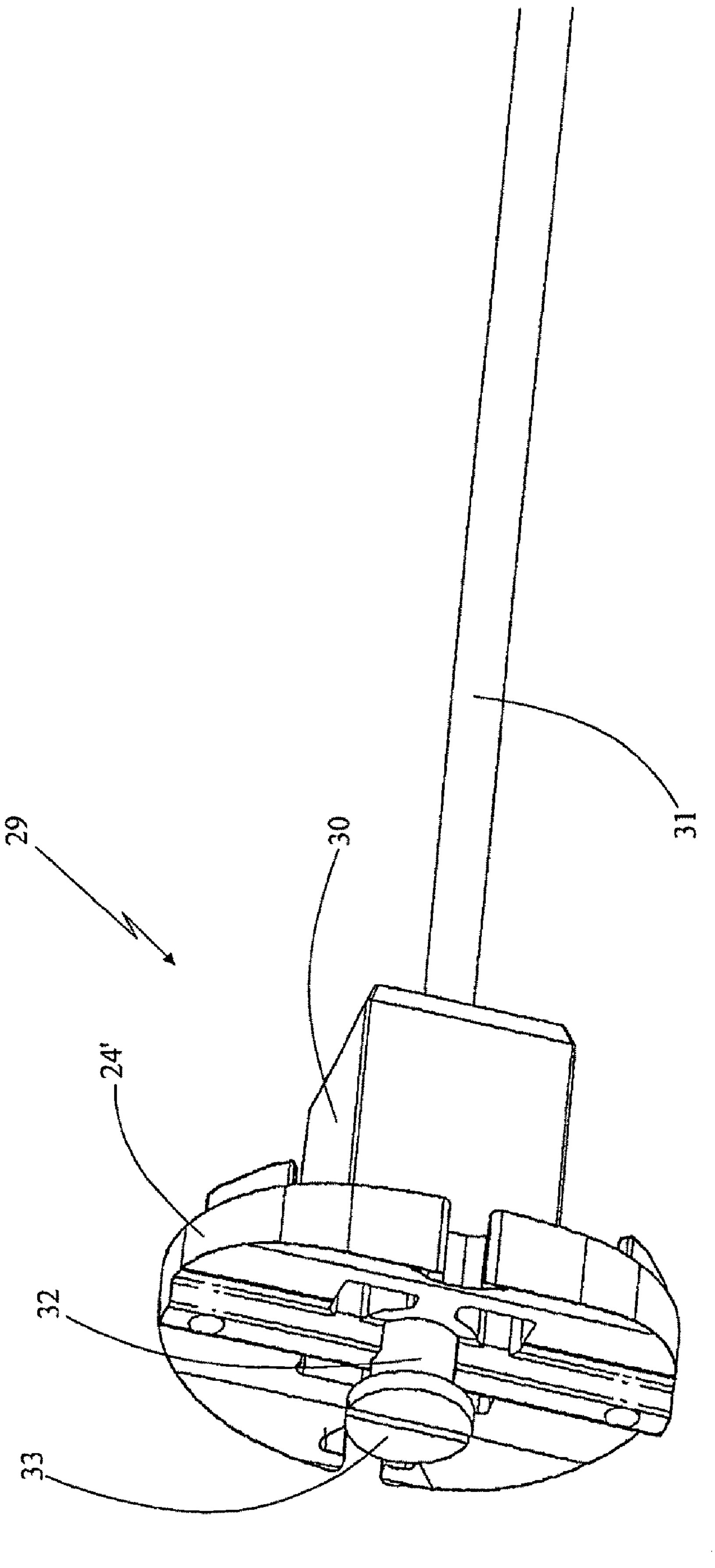
FIGS. 5A-5B show, respectively, the cross-member and the connection of the cross-member to the column in accordance with an example of the invention with some parts removed so that other parts may be seen more clearly.
Figure 5B:
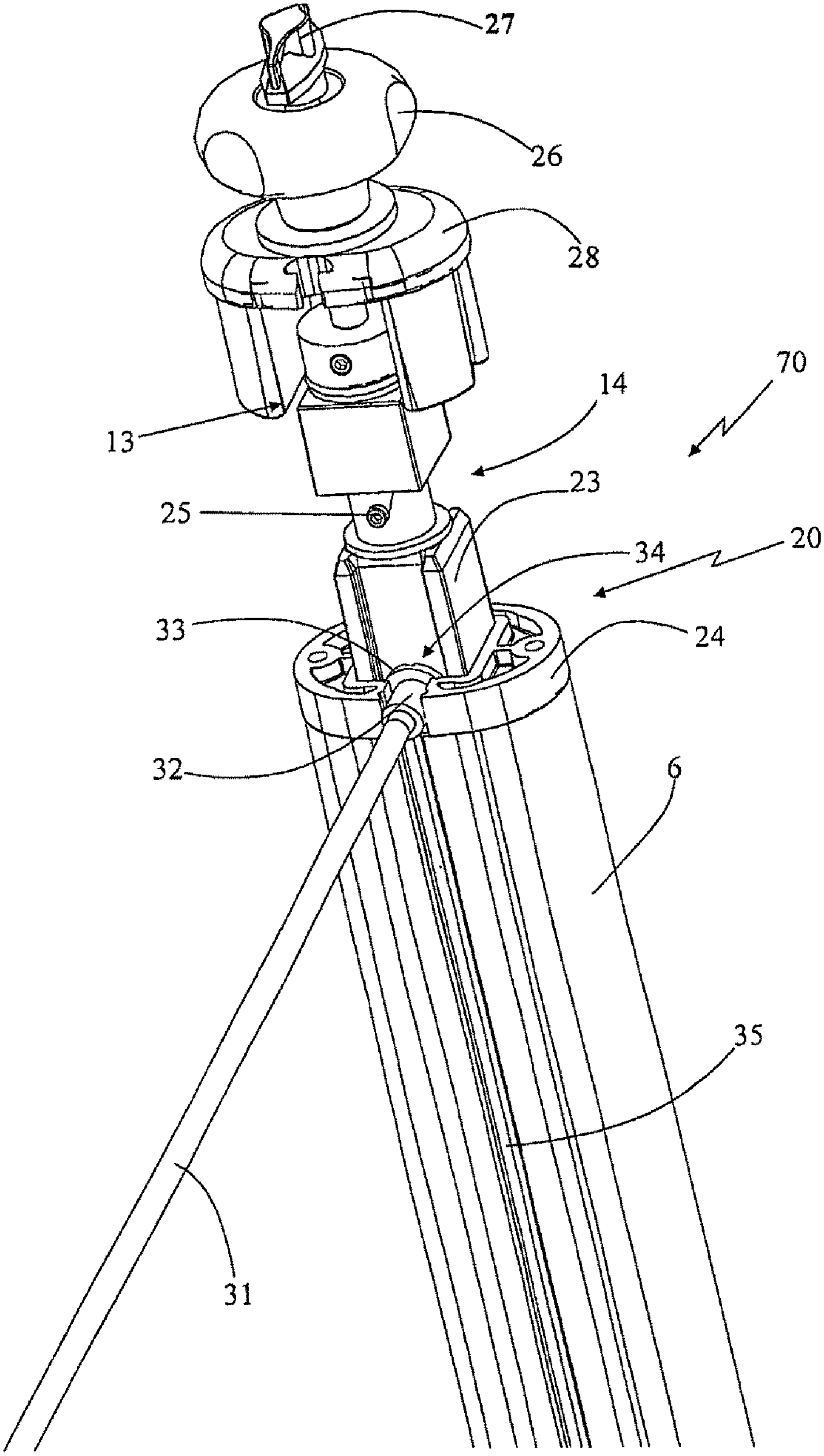
Figure 5L:
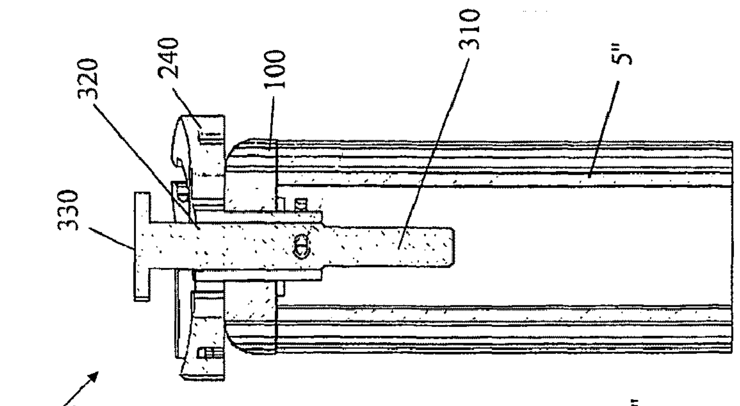
FIGS. 5C, 5D, 5E, 5F show, respectively, a side view, longitudinally sectioned view, perspective view and view with some parts removed so that other parts may be seen more clearly, of a variation of embodiment of the cross-member.
FIGS. 5G, 5H, I, L show a perspective view (FIGS. 5G and 5I) and longitudinally sectioned view of a further constructional variant of the cross-member composed of two profiles which can be joined together.
Figure 5I:
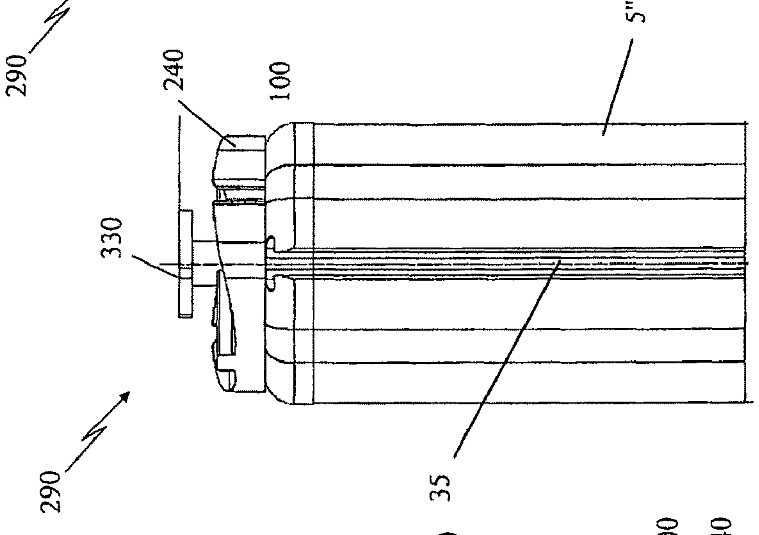
Figure 5H:
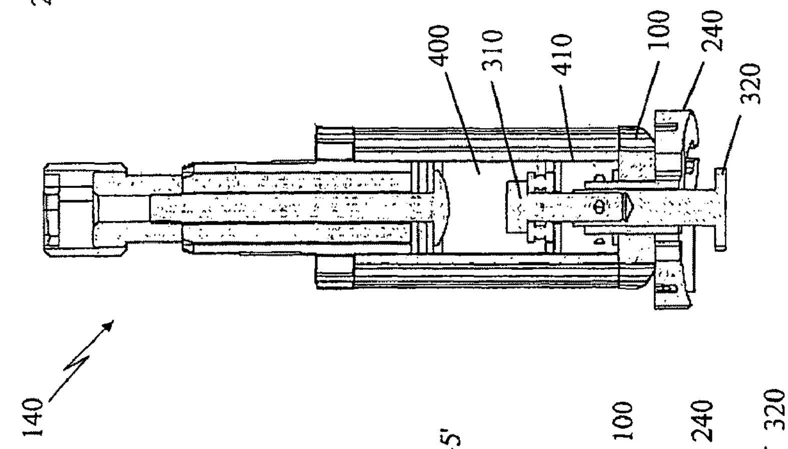
Figure 5G:
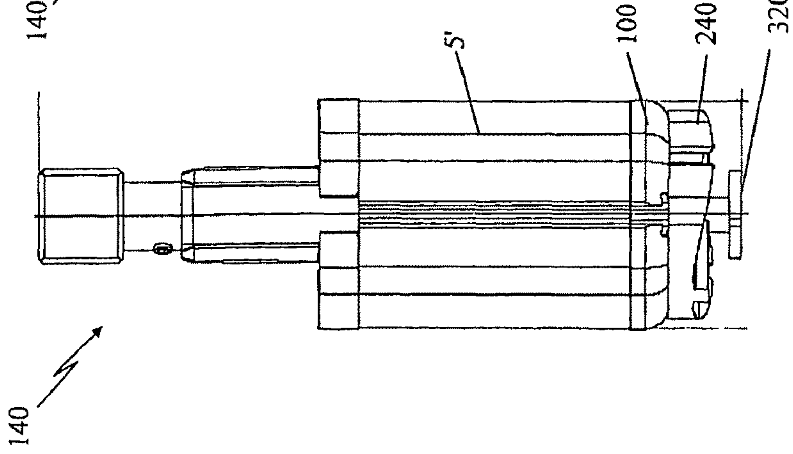

The second fixing means 70 comprise in accordance with the example of embodiment shown in FIGS. 5A and 5B, connecting couplings 29 inserted at the ends of the profiles 6 of the cross-members 5. In FIG. 5B, in particular, the covering profile 6 between the closing lid 28 and the fitting 20 has been omitted.

These couplings 29 are made preferably of plastic and are provided with an extension 30 which is engaged by means of a force-fit inside the profile 6 and with a visible peripheral portion 24' provided with a bearing surface shaped so as to tally with the advantageously elliptical profile of the column 4.

The cross-member 5 has, inserted inside it, a bar 31 which is supported by through-seats formed in the connecting couplings 29 mounted on the ends of the profile 6 of the said cross-member 5. Metal bushes 32 with an enlarged head 33 are screwed onto the ends of each bar 31. The said head is inserted inside a seat 34 provided in the visible peripheral portion 24 of the connection fitting 20 and is provided with gripping means with which a tool may be engaged for causing fixing thereof.

Alternatively, instead of the rod 31, the connection of the cross-member 5 to the column 4 may be performed by means of a projection extending from the bearing face of the connection coupling 29 and able to engage inside the said seat 34 of the connection fitting 20.

In accordance with the example of embodiment shown in FIGS. 5C-5F the second fixing means 70 comprise connecting couplings 290 which are inserted at the ends of the profiles 6 of the cross-members 5. These couplings 290 are made preferably of plastic and are formed by a cover 100 which engages with a force-fit by means extensions 300 on the end of the profile 6 and by a peripheral portion 240 provided with a bearing face 241 shaped so as to tally with the advantageously elliptical profile of the column 4. Preferably, this face is provided with a shaped projection 242 able to be inserted snugly inside the longitudinal groove 35.

In greater detail the peripheral portion 240 is mounted freely rotatably on the cover 100 by means of a central pin 380 internally housing a metallic bush 320 with the enlarged head 330. The pin is positioned in the end portion of a bar 310 which extends inside the profile 5 and is intercepted and divided into two portions by a pulling mechanism 40 formed by a hollow body with threaded facing holes inside which the two portions of the bar 310 are screwed. The hollow body is inserted inside a guide 410 of the profile 5 so as to rotate axially together with the latter.

The metal bush 320 is inserted with its head 330 so as to engage inside the seat 340 provided in the peripheral portion 24 of the connection fitting 20 of the column profile.

In order to lock rigidly the cross-member to the columns, it is sufficient to rotate the profile 5 so that the ends of the bar 310 are screwed into the pulling mechanism.

In accordance with the example of FIGS. 5G-5L, the cross-member 5 may be formed by several modules 5, 5" which are assembled in succession. For this purpose, the inner end of the bar 310 of a transverse module (5G, 5H) has, screwed thereon, an internally threaded head 140 which is shaped so as to be inserted inside the guide 410 of another transverse module 5" (5I, 5L) to be connected. The latter will engage by means of screwing via the inner end of its bar 310 with the abovementioned head 140.

The display stand envisages also fastening means for connecting to the support structure 2 an overstructure consisting of accessories or panels suitable for providing the most widely varying configurations for presenting any kind of product or service.

For this purpose, the fastening means envisage that, along the entire longitudinal extension of the profiles 6 of each column 4 and/or each cross-member 5, a groove 35 is provided for direct or indirect engagement of accessories of any kind.

This groove 35 is advantageously situated along the continuation of the abovementioned seat 34 of the connection fitting 20.

In order to facilitate the connection of accessories such as brackets, panels, hooks or the like for equipping the support structure 2 of the display stand 1 described hitherto, the fastening means may also comprise a U-shaped spring clip 36 with two arms 37 which can be resiliently splayed so as to engage elastically with the profile 6 of a column 4 or a cross-member 5.

These arms 37 have internally reliefs 38 which are intended to be inserted inside the oppositely arranged grooves 35 formed along the profiles 6.

Numerous channels 39 are formed on the outer part of the spring clip 36 for the engagement of accessories of any kind. In particular, nuts or bolts for fixing the accessories may be arranged inside the channels 39.

Further display stand fastening means for mounting accessories may envisage an engaging device 40 comprising a lever 41 which can be easily gripped and is pivotably mounted at one end 42 on a pin 49 from which there extends perpendicularly a shaft 43 which terminates in an enlarged head 44 provided with at least one side narrower than the other one and able to be inserted inside the groove 35 of the profile 6 at any height by means of engagement of the narrow side.

A cylindrical sleeve 46 with a coaxial hole which acts as a jacket for a spring 48 wound around the shaft 43 is arranged coaxially with the shaft 43. The sleeve 46 bears by means of a washer 90 against a widened ring portion 47 which is in turn pressed as a result of the force transmitted by the spring against the end 42 of the lever. The latter is shaped with an eccentric profile 50 such that its rotation about the pin 49 causes an axial displacement of the sleeve 46 which tightens or slackens the head 44 inside the groove 35, fixing or releasing the device on which the desired accessory may be later mounted.

Functionally speaking, once the head has been inserted inside the groove by means of the narrow side, the shaft is preferably rotated through 90° so as to engage the head inside the groove. At this point, by rotating the lever 41, fixing of the device 40 at the desired height along the profile is obtained.

Once the framework of the display stand 1 has been defined by means of the support structure 2 suitably configured as required owing to the versatility of the fixing means 7, 70 mentioned above, it will be possible to equip the said structure 2 with an overstructure provided in accordance with the specific requirements of the product or service to be publicised, so as to obtain different configurations of display stands, some possible examples of which obtained by fastening panels 60 of varying shape have been shown.

Each profile 6 may have a cross-section and a form different from those described and illustrated, without thereby departing from the scope of protection of the present patent.

With the display stand according to the present invention it is possible to provide a support structure 2 which can be easily assembled and disassembled and which is intended to support panels, accessories or directly or indirectly the products to be displayed such as advertising signs or banners, being particularly versatile and adaptable for the display of products of varying dimensions and associated with different areas of application.

The invention thus conceived thereby achieves the predefined objects.

Obviously, it may assume in its practical embodiment also forms and configurations different from that described above, without thereby departing from the present scope of protection.

Moreover, all the details may be replaced by technically equivalent parts, and the dimensions, the forms and the materials used may be of any nature according to requirements.

The invention claimed is:

1. Display stand for displaying products and images, which comprises:

a support structure (2) which extends from a support base (3) by means of one or more columns (4), each of which is formed by at least two modular profiles (6) which can be assembled together in succession by means of first fixing means (7), said first fixing means (7) comprising at least one male part (13) which is mechanically constrained to a first modular profile (6) and at least one female part which is mechanically constrained to a second modular profile (6), said parts being able to be removably coupled together by means of fast-fit engaging means;

fastening means which are mechanically associated with the support structure (2) so as to form an overstructure with a configuration which can be modified and is able to support directly or indirectly products or services to be displayed or publicised with different characteristics;

wherein said fixing means further comprise at least two rods (15) each axially inserted inside a respective modular profile, one of said rods having an end that carries said at least one male part (13) and the other one of said rods having an end that carries said at least one female part.

2. Display stand according to claim 1, wherein each of said rods has two ends, said one of said rods has said male part (13) at one of said ends and a female part at the other one of said ends, and, said other one of said rods has said female part (14) at one of said ends and a male part at the other one of said ends.

3. Display stand according to claim 1, wherein said fixing means comprise a connection fitting (20) which is sealingly arranged between the ends of two modular profiles (6) and provided with a through-hole inside which said rod (15) is inserted along a section.

4. Display stand according to claim 3, wherein said fixing means comprise a spring (22) which is wound around the said rod (15) and arranged between a bearing member (21) keyed onto the rod and a bottom profile of the fitting (20).

5. Display stand for displaying products and images, which comprises:

a support structure (2) which extends from a support base (3) by means of one or more columns (4), each of which is formed by at least two modular profiles (6) which can be assembled together in succession by means of first fixing means (7), said first fixing means (7) comprising at least one male part (13) which is mechanically constrained to a first modular profile (6) and at least one female part which is mechanically constrained to a second modular profile (6), said parts being able to be removably coupled together by means of fast-fit engaging means;

fastening means which are mechanically associated with the support structure (2) so as to form an overstructure with a configuration which can be modified and is able to support directly or indirectly products or services to be displayed or publicised with different characteristics;

wherein said male part (13) is configured to be inserted inside said female part following resilient compression and relative rotation.

6. Display stand according to claim 3, wherein it comprises at least one cross-member (5) formed by at least one profile (6) connected in a shelf-like manner to at least one column (4) by means of second fixing means (70) provided with couplings (29) inserted inside at least one end of the profile (6) of the cross-member (5) and resting on the outer profile of said column (4) and at least one bar (31) arranged in the profile (6) of the cross-member (5) and supported by at least one through-seat formed in the coupling (29) and provided with an enlarged head (33) intended to be inserted inside a seat (34) provided in the connection fitting (20) of the column (4).

7. Display stand according to claim 6, wherein said enlarged head is provided on a bush (32) screwed onto the end of said bar (31).

8. Display stand according to claim 3, wherein it comprises at least one cross-member (5) formed by at least one profile (6) connected in a shelf-like manner to at least one column (4) by means of second fixing means (70) provided with couplings (29) inserted in at least one end of the profile (6) of the cross-member (5) and resting on the outer profile of said column (4) and provided with a projection able to engage inside a seat (34) provided in the connection fitting (20) of the column (4).

9. Display device according to claim 1, further comprising at least two cross members and wherein said columns and/or said cross-members are provided with said fastening means for fastening products or panels or engaging parts for displaying products or services, formed by means of at least one longitudinal groove (35) provided along said columns and/or cross-members.

10. Display stand for displaying products and images, which comprises:

a support structure (2) which extends from a support base (3) by means of one or more columns (4), each of which is formed by at least two modular profiles (6) which can be assembled together in succession by means of first fixing means (7), said first fixing means (7) comprising at least one male part (13) which is mechanically constrained to a first modular profile (6) and at least one female part which is mechanically constrained to a second modular profile (6), said parts being able to be removably coupled together by means of fast-fit engaging means;

fastening means which are mechanically associated with the support structure (2) so as to form an overstructure with a configuration which can be modified and is able to support directly or indirectly products or services to be displayed or publicised with different characteristics;

wherein said display stand comprises at least one cross-member and wherein said columns and/or said cross-members are provided with said fastening means for fastening products or panels or engaging parts for displaying products or services, formed by means of at least one longitudinal groove (35) provided along said columns and/or cross-members, and said fastening means comprise at least one spring clip (36) having two resiliently flexible arms (37) for retaining between them the profile (6) of a column (4) or a cross-member (5).

11. Display stand according to claim 1, wherein said female part (14) has an eyelet (19) and said male part (13) is inserted inside said female part following resilient compression and relative rotation, said relative rotation, with the male part (13) guided by the eyelet (19) of the female part (14), being obtained by pushing one profile (6) onto the other profile.

12. Display stand according to claim 1, wherein the insertion of the male part (13) inside the female part (14) is accompanied by a rotation of the male part (13) with respect to the female part by means of tensioning of at least one spring and said at least one spring acts between a connection fitting (20) arranged sealingly between the ends of two modular profiles (6) and a hollow body (18) of the female part (14).

13. Display stand according to claim 12, wherein the resilient torque of said at least one spring (220) slackens with rotation of the male part (13) inside the hollow body (18) of the female part (14) as soon as said male part (13) passes beyond the eyelet (19) which defines the entrance inside the hollow body (18) of the female part (14), bringing said male part (13) into an offset position with respect to the eyelet (19) so as to retain said male part (13) inside the hollow body (18) of the female part (14).

14. Display stand for displaying products and images, which comprises:

a support structure (2) which extends from a support base (3) by means of one or more columns (4), each of which is formed by at least two modular profiles (6) which can be assembled together in succession by means of first fixing means (7), said first fixing means (7) comprising at least one male part (13) which is mechanically constrained to a first modular profile (6) and at least one female part which is mechanically constrained to a second modular profile (6), said parts being able to be removably coupled together by means of fast-fit engaging means;

fastening means which are mechanically associated with the support structure (2) so as to form an overstructure with a configuration which can be modified and is able to support directly or indirectly products or services to be displayed or publicised with different characteristics;

wherein said display stand further comprises at least one cross-member and wherein said columns and/or said cross-members are provided with said fastening means for fastening products or panels or engaging parts for displaying products or services, formed by means of at least one longitudinal groove (35) provided along said columns and/or cross-members, said fastening means comprise an engaging device (40) comprising a lever (41) which is pivotably mounted at one end (42) on a pin (49), a shaft (43) extending perpendicularly from said pin (49) and terminating in an enlarged head (44) which can be inserted inside the groove (35) of the profile (6).

15. Display stand according to claim 14, wherein a cylindrical sleeve (46), with a spring (48) arranged inside it, is provided coaxially with the shaft (43), which sleeve bears against a widened ring portion (47) pressed by means of the action of the spring against the end (42) of the lever, shaped with an eccentric profile (50).

16. Display stand for displaying products and images, which comprises:

a support structure (2) which extends from a support base (3) by means of one or more columns (4), each of which is formed by at least two modular profiles (6) which can be assembled together in succession by means of first fixing means (7), said first fixing means (7) comprising at least one male part (13) which is mechanically constrained to a first modular profile (6) and at least one female part which is mechanically constrained to a second modular profile (6), said parts being able to be removably coupled together by means of fast-fit engaging means;

fastening means which are mechanically associated with the support structure (2) so as to form an overstructure with a configuration which can be modified and is able to support directly or indirectly products or services to be displayed or publicised with different characteristics;

wherein said display stand comprises at least one cross-member (5) formed by at least one profile (6) connected in a shelf-like manner to at least one column (4) by means of second fixing means (70) comprising connecting couplings (290) situated at the ends of the profiles (6) of the cross-members (5) and provided with a peripheral portion (240) shaped so as to tally with the profile of the column (4) and mounted freely rotatably on the profile (6) by means of a central pin (380) connected to the end of a bar (310) which extends inside the profile (5) and is intercepted and divided into two portions by a pulling mechanism (400).

17. Display stand according to claim 16, wherein said connecting couplings (290) comprise a cover (100) which engages by means of a force-fit with the end of the profile of the cross-member and which supports the peripheral portion (240) rotatably mounted by means of said pin (380).

18. Display stand according to claim 17, wherein said pin houses internally a metal bush (320) with the enlarged head (330).

19. Display stand according to claim 16, wherein said pulling mechanism (400) is formed by a hollow body with threaded facing holes into which the two portions of the bar (310) are screwed, said hollow body being inserted inside a guide (410) of the profile (5) so as to rotate axially together with the latter, said metal bush (320) being inserted with its head (330) engaged inside the seat (340) provided in the peripheral portion (24) of the connection fitting (20) of the column profile.

20. Display stand according to claim 16, wherein said cross-member is rigidly locked to the columns rotationally carrying the profile (5), causing screwing of the ends of the bar (310) onto said pulling mechanism.

* * * * *